(12) United States Patent
Hammett et al.

(10) Patent No.: US 7,395,547 B2
(45) Date of Patent: Jul. 1, 2008

(54) SYSTEM AND METHOD FOR PROVIDING USER-DEFINED MEDIA PRESENTATIONS

(75) Inventors: Geoffrey G. Hammett, Norcross, GA (US); Robert T. Van Orden, Norcross, GA (US); John Eric West, Roswell, GA (US)

(73) Assignee: Scientific Atlanta, Inc., Lawrenceville, GA (US)

( * ) Notice: Subject to any disclaimer, the term of this patent is extended or adjusted under 35 U.S.C. 154(b) by 1050 days.

(21) Appl. No.: 09/827,470

(22) Filed: Apr. 6, 2001

(65) Prior Publication Data

US 2002/0147977 A1 Oct. 10, 2002

(51) Int. Cl.
*H04N 7/10* (2006.01)
*H04N 7/025* (2006.01)
*H04N 5/445* (2006.01)

(52) U.S. Cl. .................. 725/34; 725/59; 725/61

(58) Field of Classification Search .............. 725/32, 725/34, 36–39, 41, 53, 44–47, 59, 61, 86; 715/704, 723
See application file for complete search history.

(56) References Cited

U.S. PATENT DOCUMENTS

| | | | | |
|---|---|---|---|---|
| 4,393,502 A | * | 7/1983 | Tanaka et al. | 714/755 |
| 5,534,911 A | * | 7/1996 | Levitan | 725/46 |
| 5,729,280 A | * | 3/1998 | Inoue et al. | 725/101 |
| 5,880,768 A | | 3/1999 | Lemmons et al. | 348/1 |
| 5,978,043 A | * | 11/1999 | Blonstein et al. | 348/569 |
| 6,088,722 A | * | 7/2000 | Herz et al. | 709/217 |
| 6,177,931 B1 | | 1/2001 | Alexander et al. | 345/327 |
| 6,192,340 B1 | * | 2/2001 | Abecassis | 704/270 |
| 6,216,264 B1 | * | 4/2001 | Maze et al. | 725/53 |
| 6,441,832 B1 | * | 8/2002 | Tao et al. | 715/723 |
| 6,601,237 B1 | * | 7/2003 | Ten Kate et al. | 725/47 |
| 6,670,971 B1 | * | 12/2003 | Oral | 715/769 |
| 2002/0073425 A1 | * | 6/2002 | Arai et al. | 725/44 |
| 2002/0138641 A1 | * | 9/2002 | Taylor et al. | 709/231 |

FOREIGN PATENT DOCUMENTS

| EP | 0834798 | 4/1998 |
|---|---|---|
| EP | 1126701 | 8/2001 |

* cited by examiner

*Primary Examiner*—Hunter B. Lonsberry

(57) ABSTRACT

A media system including memory to store media information that characterizes the media and a processor configured by the memory to provide a user interface to enable a user to define a media presentation from the media information. The processor is configured by the memory to continually and automatically segue media stream changes among a plurality of the media streams containing the media to present the user defined media presentation.

33 Claims, 26 Drawing Sheets

My Channel Selection Configuration

1400

Artist Choices

- David, David
- Dent, Al
- Deziree — 1435
- Dillon, Dean
- Dimmond, Ester

◄ SEL ►

1450

Index ◄ ▲ ▼ | B | C | D

My Channel#1 — 115
SELECTIONS:
1.0 Artist
    1.1 Adam, John
2.0 Title--None Listed
3.0 Composer--None Listed
4.0 Date of Composition--None Listed
5.0 Genre--None Listed
EXCLUSIONS:
--None Listed Highlight selection and "SEL" to configure rank, or press "C" to change index or "A" to search for a desired selection

A Search    B Back to Current Category Configuration Screen    C Change Index

FIG. 14

Configure As Selection or Exclusion

Artist Choice

Deziree

| Rank/Delete | ▲ | 1 | 2 | ▲ |

1614

My Channel#1 -- 115
SELECTIONS:
1.0 Artist
    1.1 Adam, John
2.0 Title--None Listed
3.0 Composer--None Listed
4.0 Date of Composition--None Listed
5.0 Genre--None Listed
EXCLUSIONS:
--None Listed Rank and then "A" to add to selections, "C" to add to exclusions ▲ Add to Selections     C     Add to Exclusions

Configure As Selection or Exclusion

Artist Choice

Kill, Cody — 1930

Rank/Delete  ▲ 3 ▼  DEL

1910

My Channel#1 --- 115
SELECTIONS:
1.0 Artist
    1.1 Deziree
    1.2 Adam, John
2.0 Title--None Listed
3.0 Composer--None Listed
4.0 Date of Composition--None Listed
5.0 Genre--None Listed
EXCLUSIONS:
--None Listed Rank and then "A" to add to selections, "C" to add to exclusions

A Add to Selections

C Add to Exclusions — 1966

Configure As Selection or Exclusion

Artist Choice

Adam, John

| Rank/Delete | ◀ 2 DEL ▶ |

My Channel#1---115
SELECTIONS:
1.0 Artist
   1.1 Deziree
   1.2 Adam, John
2.0 Title--None Listed
3.0 Composer--None Listed
4.0 Date of Composition--None Listed
5.0 Genre--None Listed
EXCLUSIONS:
--None Listed Rank and then "A" to add to selections, "C" to add to exclusions

A Add to Selections     C Add to Exclusions

FIG. 24

SYSTEM AND METHOD FOR PROVIDING USER-DEFINED MEDIA PRESENTATIONS

TECHNICAL FIELD

The present invention is generally related to television systems, and, more particularly, is related to a method and apparatus for enabling a user to define and present media presentations tailored to individual preferences.

BACKGROUND OF THE INVENTION

With recent advances in digital transmission technology, subscriber television systems are now capable of providing much more than the traditional analog broadcast video. In implementing enhanced programming, the home communication terminal device ("HCT"), otherwise known as the set-top box, has become an important computing device for accessing media services (and media within those services) and navigating a user through a maze of available services. In addition to supporting traditional analog broadcast video/audio functionality, HCTs now also support an increasing number of one-way digital and two-way digital services such as video-on-demand.

Typically, an HCT is connected to a cable or satellite television network and includes hardware and software necessary to provide the functionality of the digital television system at the user's site. Preferably, some of the software executed by an HCT is downloaded and/or updated via the subscriber television network. Each HCT also typically includes a processor, communication components, and memory, and is connected to a television or other display device, such as a personal computer. While many conventional HCTs are stand-alone devices that are externally connected to a television, an HCT and/or its functionality may be integrated into a television or personal computer or even an audio device such as a radio, as will be appreciated by those of ordinary skill in the art.

As more and more services and applications are provided, subscriber television systems are providing media information to the HCT so that the user can view such information on the display connected to the HCT or a remote device such as the television. The media information allows the viewer to learn more about the available media by including such information as name and title and start and end times of the media. This media information has traditionally been organized for presentation purposes into a media guide format that presents the media information by time and channel only. The media guide can, for instance, automatically scroll the available television channels to present the media information.

Many subscriber television system operators, for instance, cable system operators, include one or more dedicated channels that scroll through the channel list displaying information about programs delivered from the cable headend that not only are currently on the cable network, but also are scheduled to be on in the future. These types of passive displays lack interactive functionality from the user. For example, the user typically must view the media information as it scrolls on the display and wait for either the desired channel and/or the desired time to search for the media that may be available for viewing. However, adding user interactivity involves two-way communication between the user set-top box and the head end, which comes at a cost of increased back office operation and additional bandwidth to support one-to-one, on demand content delivery.

As a result, there is a need for a media system that enables viewers to easily and efficiently locate media that they are seeking without requiring excessive bandwidth or increased operational demands at the head end.

Thus, a heretofore unaddressed need exists in the industry to address the aforementioned deficiencies and inadequacies.

SUMMARY OF THE INVENTION

The preferred embodiment of the present invention can be viewed as a media system for providing user-defined media presentations received from a remote location. This media system includes a memory to store media information received from a remote location wherein the media information characterizes the media for the media presentations. Also, this media system includes a processor configured by the memory to provide a user interface to enable a user to define the media presentations from the media information, wherein the processor is further configured by the memory to continually segue media stream changes among a plurality of broadcast media streams containing the media for the media presentations defined by the user.

The preferred embodiment of the present invention can also be viewed as a method for presenting user-defined media presentations. This method includes providing a user interface to a user to receive user input corresponding to the desired media information, wherein the media information characterizes the media for the user defined media presentations. This method also includes searching for the media corresponding to the user-defined media information among a plurality of media streams. This method also includes presenting the media corresponding to the media information, including segueing media stream changes among a plurality of media streams to present the media corresponding to the desired media information.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The preferred embodiment of the present invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 14 is an example user interface screen responsive to the user scrolling highlighted window to the artist "Deziree".

FIG. 16 is an example user interface screen responsive to the user scrolling the highlighted window to the rank of "1".

FIG. 19 is an example user interface screen responsive to the user selecting the select button in user interface screen of FIG. 18.

FIG. 24 is an example user interface screen responsive to the user selecting the select button in the example user interface screen of FIG. 23.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

Figure 1:
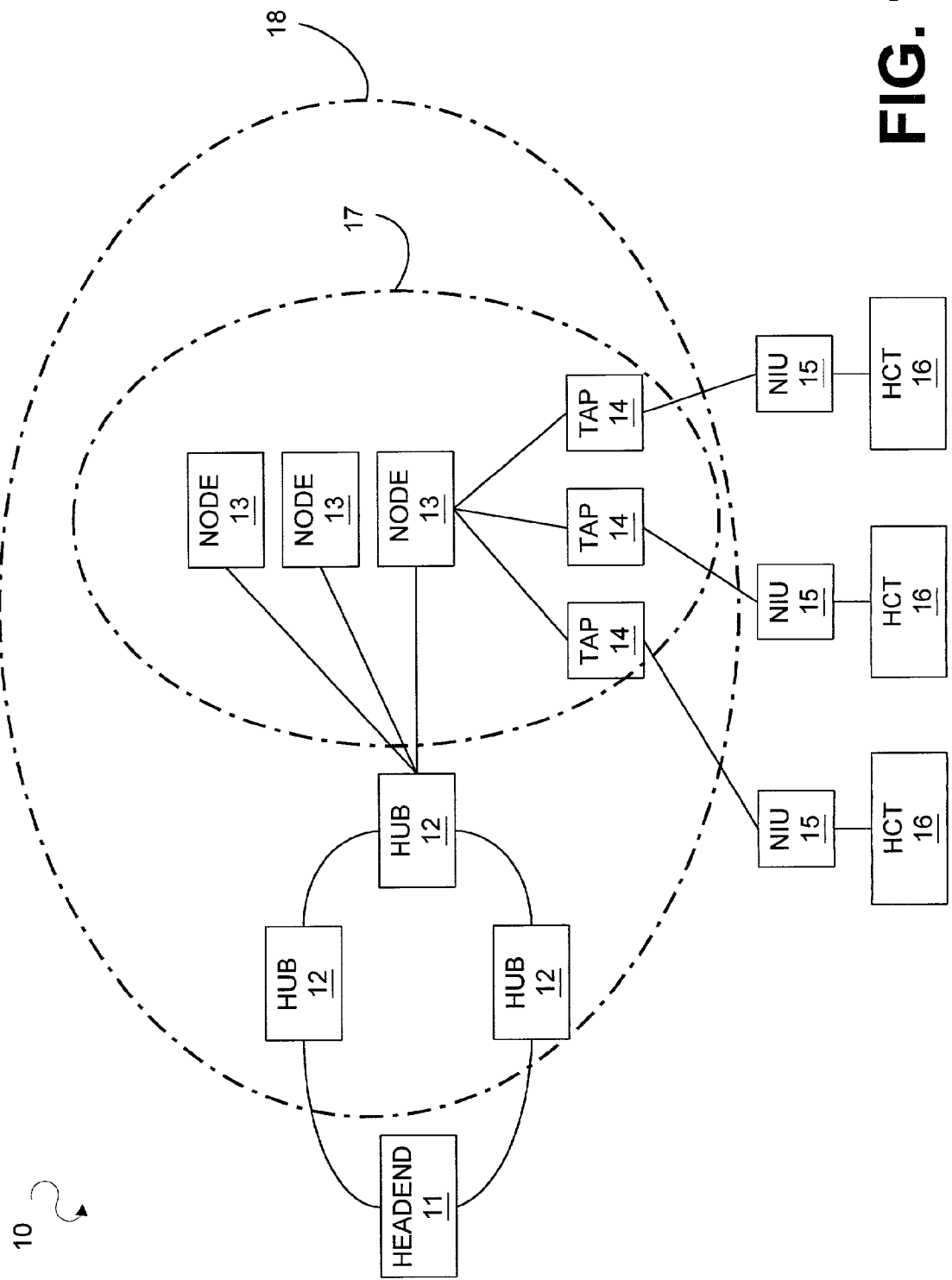
FIG. 1 is a block diagram of a cable television system in accordance with one embodiment of the present invention.

One preferred embodiment of the present invention is generally implemented as part of a subscriber television system such as, for a non-limiting example, a cable television system (CTS). Hence, an illustrative CTS and its operation will be described initially. FIG. 1 shows a block diagram view of a cable television system (CTS) 10, which is generally a high quality, reliable and integrated network system that is preferably capable of delivering video, audio, voice and data services to home communication terminal devices (HCTs) 16. Although FIG. 1 depicts a high level view of a CTS 10, it should be appreciated that a plurality of cable television systems can tie together a plurality of regional networks into an integrated global network so that HCT users can receive media provided from anywhere in the world.

The CTS 10 preferably delivers broadcast video signals as digitally formatted signals in addition to delivering traditional broadcast analog video signals. Furthermore, the system can preferably support one way broadcast services as well as both one-way data services and two-way media and data services. The two-way operation of the network preferably allows for user interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections.

The CTS 10 also provides the interfaces, network control, transport control, session control, and servers to access media from media services, and distributes media to HCT users. As shown in FIG. 1, a typical CTS 10 comprises a head end 11, hubs 12, an HFC access network 17, and HCTs 16. It should be appreciated that although a single component (e.g. a head end) is illustrated in FIG. 1, a CTS 10 can feature a plurality of any one of the illustrated components or may be configured with alternative embodiments for any one of the individual components or with yet other additional components not enumerated above.

Media provided by one or more content providers (not shown) is communicated by the content providers to one or more head ends 11. From those head ends 11 the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is connected to a network interface unit (NIU) 15 which is connected to a home communication terminal device (HCT) 16. The NIU 15 is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers.

As the high-level operations of many of the functions of the cable television system (CTS) 10 are well known to those of skill in the art, further high level description of the overall CTS 10 of FIG. 1 will not be contained herein. It will be appreciated, however, that the CTS 10 shown in FIG. 1 is merely illustrative and should not be construed as implying any limitations upon the scope of the present invention. For instance, subscriber television systems also included within the scope of the invention include systems not utilizing physical structured cabling for transmission, such as, but not limited to, satellite systems. Further, transmission mediums included within the scope of the invention include, but are not limited to, HFC, optical, satellite, RF, FM, and microwave. Further, data provided from the head end 11 to the HCTs 16 and programming necessary to perform the functions discussed below will be understood to be present in the CTS 10, in accordance with the description below.

Figure 2:
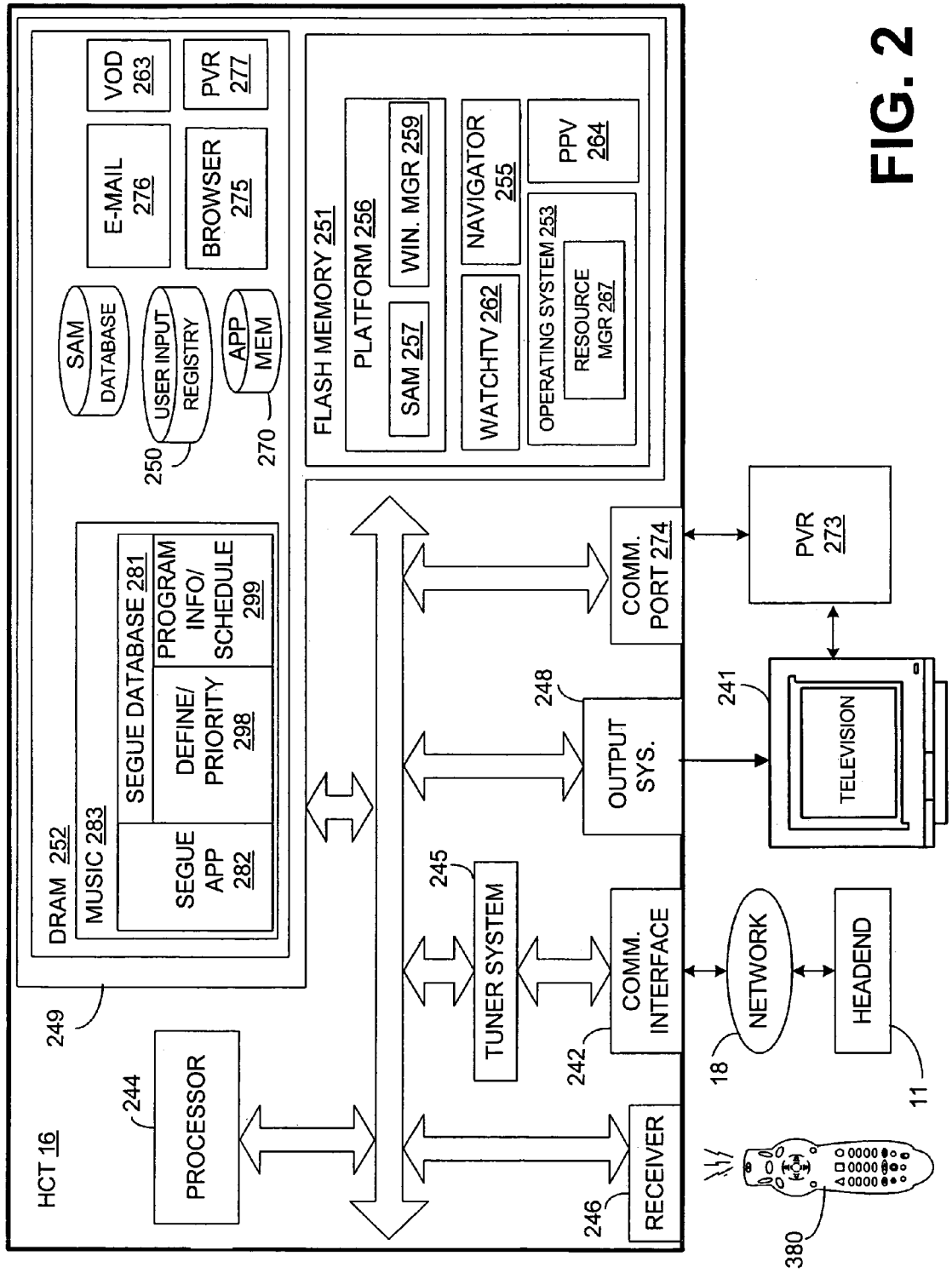
FIG. 2 is a block diagram of the HCT depicted in FIG. 1 and related equipment, in accordance with one embodiment of the present invention.

FIG. 2 is a block diagram illustrating an HCT 16 (also referred to as a home communication terminal) that is coupled to a head end 11 and to a television 241, and in one implementation, a personal video recorder (PVR) 273. An HCT 16 is typically situated at a user's residence or place of business and may be a stand-alone unit or integrated into another device such as, for example, a television set, a video recorder, a radio, a personal computer, or other media device. The HCT 16 preferably includes a conventional communications interface 242 for receiving RF signals, which can include video, audio and/or information data, from the head end 11 through the network 18 and for providing any reverse information to the head end 11 through the network 18.

The home communication terminal (HCT) 16 further includes a processor 244 for controlling operations of the HCT 16, an output system 248 for driving the television display 241, and a tuner system 245 for tuning into one or more particular media streams for retrieving media and media information to be presented and for sending and receiving various types of data from the head end 11. The output system 248 also preferably includes other conventional outputs, including, but not limited to, conventional audio outputs for a conventional attached stereo system (not shown), etc. The tuner system 245 includes, in one non-limiting example implementation, an out-of-band tuner for bi-directional quadrature phase shift keying (QPSK) data communication and a quadrature amplitude modulation (QAM) tuner for receiving television signals.

The HCT 16 may be coupled to a personal video recorder 273 through a communications port 274. A personal video recorder (PVR) 273 is a video recorder for recording media, preferably via a digital recording mechanism. A PVR 273 comprises a local storage device in which media can be written to and stored and later read from and retrieved for presentation.

A receiver 246 receives externally-generated information, such as user inputs or commands from other devices. The user inputs may, for example, be provided via a remote control device 380, an infrared (IR) or wired keyboard (not shown), keys in the front panel of HCT 16 (not shown), or mouse (not shown), or some other input device.

In one implementation, the HCT 16 includes system memory 249, which includes flash memory 251 and dynamic random access memory (DRAM) 252, for storing various applications, modules and data for execution and use by the processor 244 of the HCT 16. Both the flash memory 251 and the DRAM memory 252 are coupled to the processor 244 for storing configuration data and operational parameters, such as commands that are recognized by the processor 244. Basic functionality of the HCT 16 is provided by an operating system 253 that is contained in flash memory 251. Among other things, the operating system 253 includes at least one resource manager 267 that provides an interface to resources of the HCT 16 such as, for example, computing resources.

One or more programmed software applications, herein referred to as applications, is executed by utilizing the computing resources in the HCT 16. The application executable program stored in flash memory 251 or DRAM memory 252 is executed by processor 244 (e.g., a central processing unit or digital signal processor) under the auspices of the operating system 253. Data required as input by the application is stored in DRAM memory 252 or flash memory 251 and read by processor 244 as need be during the course of application execution. Input data may be data stored in DRAM memory 252 by a secondary application or other source, either internal or external to the HCT 16, or possibly anticipated by the application and thus created with the application at the time it was generated as a software application program. Data may be received via any of the communication ports of the HCT 16, from the head end 11 via the HCTs network communication interface 242 in coordination with the tuner system 245 or as user input via receiver 246. Data generated by the application is stored in DRAM memory 252 by processor 244 during the course of application program execution.

An application referred to as a navigator 255 is resident in flash memory 251 for providing a navigation framework for services provided by the HCT 16. The navigator 255 registers for and in some cases reserves certain user inputs related to navigational keys such as channel increment/decrement, last channel, favorite channel, etc. The applications may be resident in flash memory 251 or downloaded into DRAM 252. The navigator 255 also provides users with television related menu options that correspond to HCT functions such as, for example, adding a channel to a favorites list, blocking or excluding a channel or a group of channels from being presented, activating parental control, and displaying media titles, etc. Some of the functionality performed by applications executed in the HCT 16 (such as the broadcast music application 283) may instead be performed at the head end 11, and vice versa, in some embodiments of the present invention.

The flash memory 251 also contains a platform library 256. The platform library 256 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 256 that are shown in FIG. 2 are a window manager 259 and a client service application manager (SAM) 257.

The window manager 259 provides a mechanism for implementing the sharing of the screen regions and user input. The window manager 259 on the HCT 16 is responsible for, as directed by one or more applications, implementing the creation, display, and de-allocation of the limited HCT 16 screen resources. It allows multiple applications to share the screen by assigning ownership of screen regions, or windows. The window manager 259 also maintains, among other things, a user input registry 250 in DRAM 252 so that when a user enters a key or a command via the remote control device 380 or another input device such as a keyboard or mouse, the user input registry 250 is accessed to determine which of various applications running on the HCT 16 should receive data corresponding to the input key and in which order. As an application is executed, it registers a request to receive certain user input keys or commands. When the user selects a key corresponding to one of the commands on the remote control device 380, the command is received by the receiver 246 and relayed to the processor 244. The processor 244 dispatches the event to the operating system 253 where it is forwarded to the window manager 259 which ultimately accesses the user input registry 250 and routes data corresponding to the incoming command to the appropriate application.

The SAM client 257 is a client component of a client-server pair of components, with the server component being located on the head end 11. The SAM client 257 is a part of the platform library 256. The client SAM 257 also interfaces with the resource manager 267, as discussed below, to control resources of the HCT 16.

Many media services can be defined using the same application component, with different media parameters. Examples of media services include, without limitation and in accordance with one implementation, presenting broadcast music programs (via a broadcast music application 283), television programs (via a WATCHTV application 262), pay-per-view (PPV) events (via a PPV application 264), video-on-demand (via a VOD application 263). The term "media" is herein understood to include, among others, any audio and/or visual information or event recognized for its informational or entertainment value. By way of non-limiting example, media may include a movie or a song, etc. Media information is characterizing information about the media, including but not limited to titles, start and end times, channel location, etc. The term "media stream" is herein defined to include a sequential supply of media provided by a media service, such as, by way of non-limiting example, a channel of broadcast music. In general, the identification of a media service includes the identification of an executable application that affects the media service and also includes a set of application-dependent parameters or identifiers that indicate to the application the specific media stream to be provided.

Applications may be downloaded into DRAM 252 at the request of the client service application manager (SAM) 257, typically in response to a request by the user or in response to a message from the head end 11. In this non-limiting example DRAM 252 contains a broadcast music application 283, VOD application 263, an e-mail application 276, a PVR application 277, and a web browser application 275. It should be clear to one with ordinary skill in the art that these applications are not limiting and merely serve as examples for this present embodiment of the invention. DRAM 252 also includes application memory 270 that various applications may use for storing and retrieving data. Furthermore, one or more DRAM 252 based applications, as an alternative embodiment, may be resident in flash memory 251 or vice versa. These applications, and others provided by the cable system operator, are top level software entities on the network for providing media services to the user. In addition, the scope of the present invention includes embodiments in which applications are combined or divided in other combinations to accomplish one or more of the discussed functions.

In one implementation, applications executing on the HCT 16 work with the navigator 255 by abiding by several guidelines. First, an application utilizes the Client SAM 257 for the provision, activation, and suspension of services. Second, an application shares HCT 16 resources with other applications and abides by the resource management policies of the Client SAM 257, the operating system 253, and the HCT 16. Third, an application handles situations where resources are unavailable without navigator 255 intervention. Fourth, when an application loses service authorization while providing a service, the application suspends the service via the Client SAM 257 (the navigator 255 will reactivate an individual service application when it later becomes authorized). Finally, an application is designed to not have access to certain user input keys reserved by the navigator 255 (i.e., power, channel +/−, volume +/−, etc.).

An executable program or algorithm corresponding to an operating system (OS) component, or to a client platform component, or to an application, or to respective parts thereof, can reside in and execute out of DRAM 252 and/or flash memory 251. Likewise, data input into or output from any executable program can reside in DRAM 252 or flash memory 251. Furthermore, an executable program or algorithm corresponding to an OS component, or to a client platform component, or to an application, or to respective parts thereof, can reside in flash memory 251, or in a local storage device connected to HCT 16 and can be transferred into DRAM 252 for execution. Likewise, data input for an executable program can reside in flash memory 251 or a storage device and can be transferred into DRAM 252 for use by an executable program or algorithm. In addition, data output by an executable program can be written into DRAM 252 by an executable program or algorithm and can be transferred into flash memory 251 or into a storage device for storage purposes. The present invention is not limited by where or how data and/or applications are stored or retrieved.

In the preferred embodiment of the present invention, the segue application 282 and segue database 281 are downloaded by the head end 11 as part of a sub-program within the broadcast music application 283. Alternatively, the segue application 282 and segue database 281 may be downloaded by the head end 11 as a separate application stored in system memory 249 that interacts with the broadcast music application 283 or any other application, such as but not limited to WatchTV 262. Alternatively, the segue application 282 and segue database 281 may be an application integrated into the HCT 16, stored in, for non-limiting example, system memory 249. In other embodiments, at least part of the segue application 282 functionality may occur at the headend 11. In other embodiments, the segue application 282 may play a more limited role. Although the preferred embodiment is described herein, it is understood by those skilled in the art that the segue application 282 and the segue database 281 may serve any other media application (for non-limiting example, WatchTV 262) as an integral part of the media application or external to the media application.

The segue application 282, in communication with the processor 244 and tuner system 245 and segue database 281, functions to provide the segueing capability for the broadcast music application 283, as well as the configuring of user interface screens at the HCT 16 for the broadcast music application 283. In the conventional subscriber network distribution system, for a non-limiting example, it is most efficient to distribute media in a broadcast manner, that is, several "channels" or media streams segmented by category broadcast such that any authorized subscriber with access to the network can tune to the channel to receive media. The broadcast approach allows a subscriber to pick a preferred category of media on a static basis while minimizing the back office operation and additional bandwidth that is required with a one-to-one, on-demand media delivery scheme. It does not, however, allow for customization or tailoring the media presentation to the subscribers' desires. The segue application 282 enables the subscriber to specify his/her preferences to, by way of non-limiting example, the HCT 16 and to deliver a service which dynamically extracts media corresponding to the preferences from the broadcast channels. This approach provides a richer subscriber experience than that delivered by statically tuned channels, but preserves the efficiency of distributing the media in a broadcast fashion.

The segue database 281 includes at least two primary data structures. One data structure is the program information/schedule data structure 299. The program information/schedule data structure stores media information received from the head end 11 for media available though an application, for non-limiting example, broadcast music 283. The application is configured to receive media and media information from the head end 11, as will be described in greater detail in association with FIG. 5. By way of non-limiting example, the program information/schedule data structure 299 may store the media information for all of the songs available through the broadcast music application 283. This media information is categorized under media information categories which may include, among others, song genre, song title, song artist, composer, data of composition, and other timing descriptor data such as start and end times of the songs and their frequency or channel location.

Another data structure resident within the segue database 281 is the define/priority data structure 298. The define/priority data structure 298 stores the user's configurations and their corresponding rank or priority within a custom media presentation. By way of non-limiting example, songs available through the broadcast music application 283 may have their corresponding media information characterized for display to a user in a user interface screen at the television. Media information is retrieved by the segue application 282 from the program information/schedule data structure 299. When the user selects and prioritizes the media information corresponding to the desired media or song from the display screen, this configuration is transferred by the segue application 282 to the define/priority data structure 298. The segue application 282, based on the user's configurations, searches for the media corresponding to available media information stored in the program information/schedule data structure 299 of the segue database 281 that meet the user's configurations. The segue application 282 will use the media information to segue media stream changes to provide a custom presentation, as will be described in greater detail later.

In an alternative embodiment, applications such as, for non-limiting example, the broadcast music application 283, may store the data structures of the segue database 281 in application memory 270, wherein the segue application 282 interacts directly with application memory 270. Furthermore, if an electronic program guide (EPG) application and respective database exist, the EPG application may store relevant information in the EPG database, and the segue application 282 may conduct search operations in this database (not shown) as well. The present invention is not limited by where or how the media information is stored or retrieved. In one embodiment, the segue application 282 may play a more limited role of providing a user interface for user input, but software with segue application 282 functionality at the headend 11 searches for the user defined media presentation selections among the plurality of media streams and communicates to the HCT 16 which media stream to tune to. In other embodiments, the functionality of the segue application 282 may be an application operated at the headend 11 in a browser-type embodiment, wherein the headend 11 generates and sends to the HCT 16 screens with media information choices for presentation to the user, and the user makes selections that are stored in a database similar to the segue database 281 at the head end 11. The headend 11 may then process the selections and priorities defined by the user and deliver tuning instructions to the HCT 16. The segue application 282 functionality at the HCT 16 is limited, and most of the segue application 282 functionality is provided by an application at the headend 11, wherein the headend 11 communicates to the HCT 16 which channel to tune to segue into the media presentation desired. This communication may be, by way of non-limiting example, executed in accordance with the head end 11 directing the HCT 16 tuner system 245 as to what MPEG-2 stream to tune to, as in described in U.S. Pat. No. 5,600,378 which is hereby incorporated by reference in its entirety.

Figure 3:
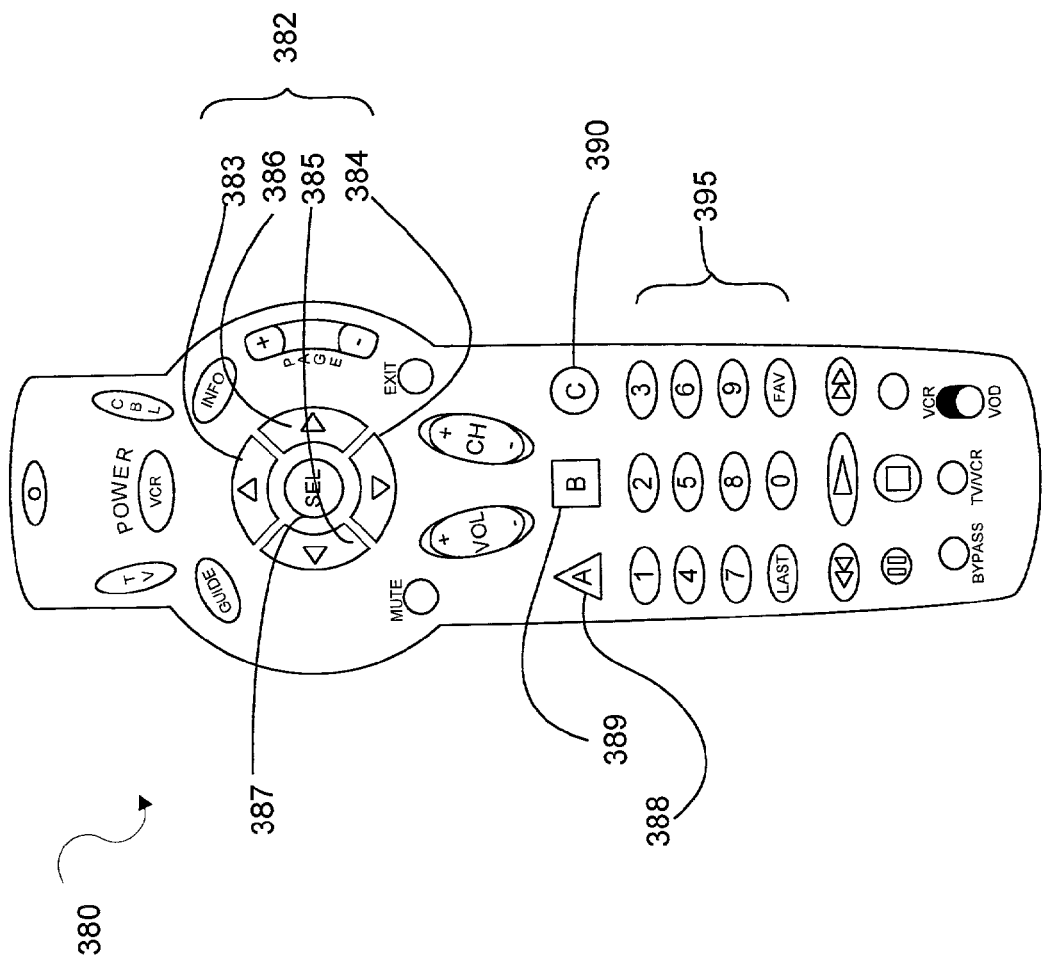
FIG. 3 is one example remote control device that may be used to provide user input to the HCT shown in FIG. 2.

FIG. 3 illustrates a non-limiting example of a remote control device 380 that is used to provide user input to the HCT 16. The arrow buttons 382 include an up arrow button 383, a down arrow button 384, a left arrow button 385, and a right arrow button 386 that are used to scroll through options or selections and/or to highlight an option or selection. The select button 387 may be used to select a currently highlighted option or selection that is provided to the user. Lettered button "A" 388, "B" 389, and "C" 390 may be used to implement functions on a user interface screen that have the corresponding letter. Numeric buttons 395 may be used to enter numbers, or configured with the application to enter letters corresponding to the numeric buttons 395. Many alternative methods of providing user input may be used including a remote control device with different buttons and/or button layouts, a keyboard device, a voice activated device, etc. The invention described herein is not limited by the type of device used to provide user input.

Figure 4:
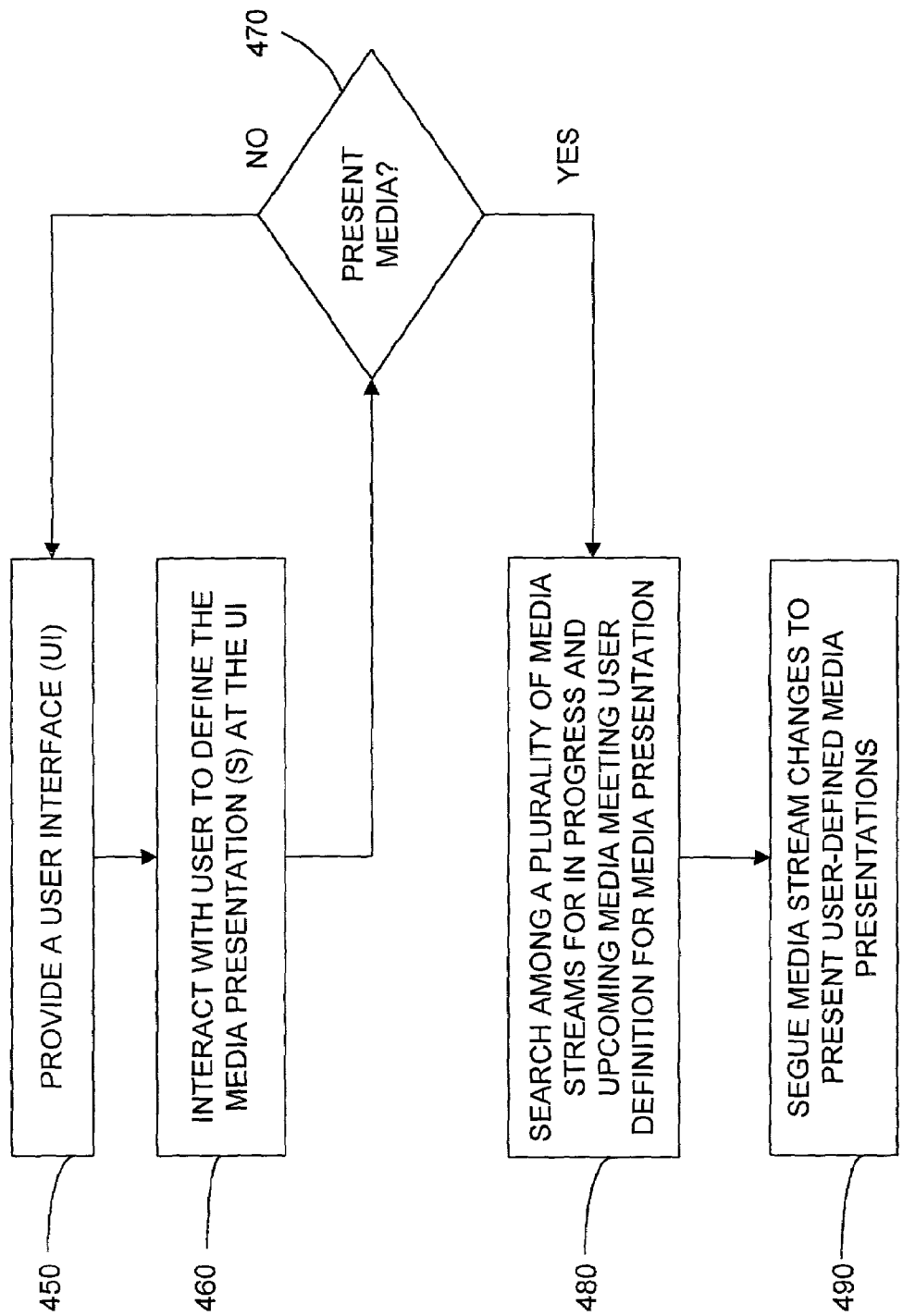
FIG. 4 is a flow chart that illustrates a method of presenting user-defined media presentations.

The flow chart of FIG. 4 shows one preferred method for defining and presenting media presentations according to the media information. In this regard, each block represents a step for defining and presenting media presentations according to the preference of the user. It should also be noted that in some alternative implementations, the functions noted in the blocks might occur out of the order noted in FIG. 4. For example, two blocks shown in succession in FIG. 4 may in fact be executed substantially concurrently or the blocks may sometimes be executed in the reverse order, depending upon the functionality involved, as will be further clarified below. Step 450 is the step of providing a user interface for the broadcast music application 283. In the preferred embodiment, this screen may be displayed as a result of the user selecting the broadcast music application 283 from an electronic service guide generated by an electronic service guide application resident in the HCT 16. Other methods of introducing the user interface of the preferred embodiment are also included within the scope of the present invention. Step 460 is interacting with the user to define, or configure, the media presentation or media presentations via interaction with the user interface. Note that although one user is described here, it is understood that there may be more than one user. Further, it is understood that one user may have more than one custom media presentation (or "my channels"). The user interface screen may display several selection options and instructions to guide the user in defining the custom media presentation. The user interface display may prompt the user 470 to decide whether the user is ready to begin a media presentation or whether the user needs to define a media presentation. If further definition is needed, the user may make further selections from one or more display options. If the user is ready for the media presentation, then step 480 is commenced to search through media information corresponding to media in a plurality of media streams for media in progress and upcoming meeting the user definition for the media presentation. Step 490 segues media stream changes among the plurality of media streams to present the user-defined media presentation.

Figure 5:
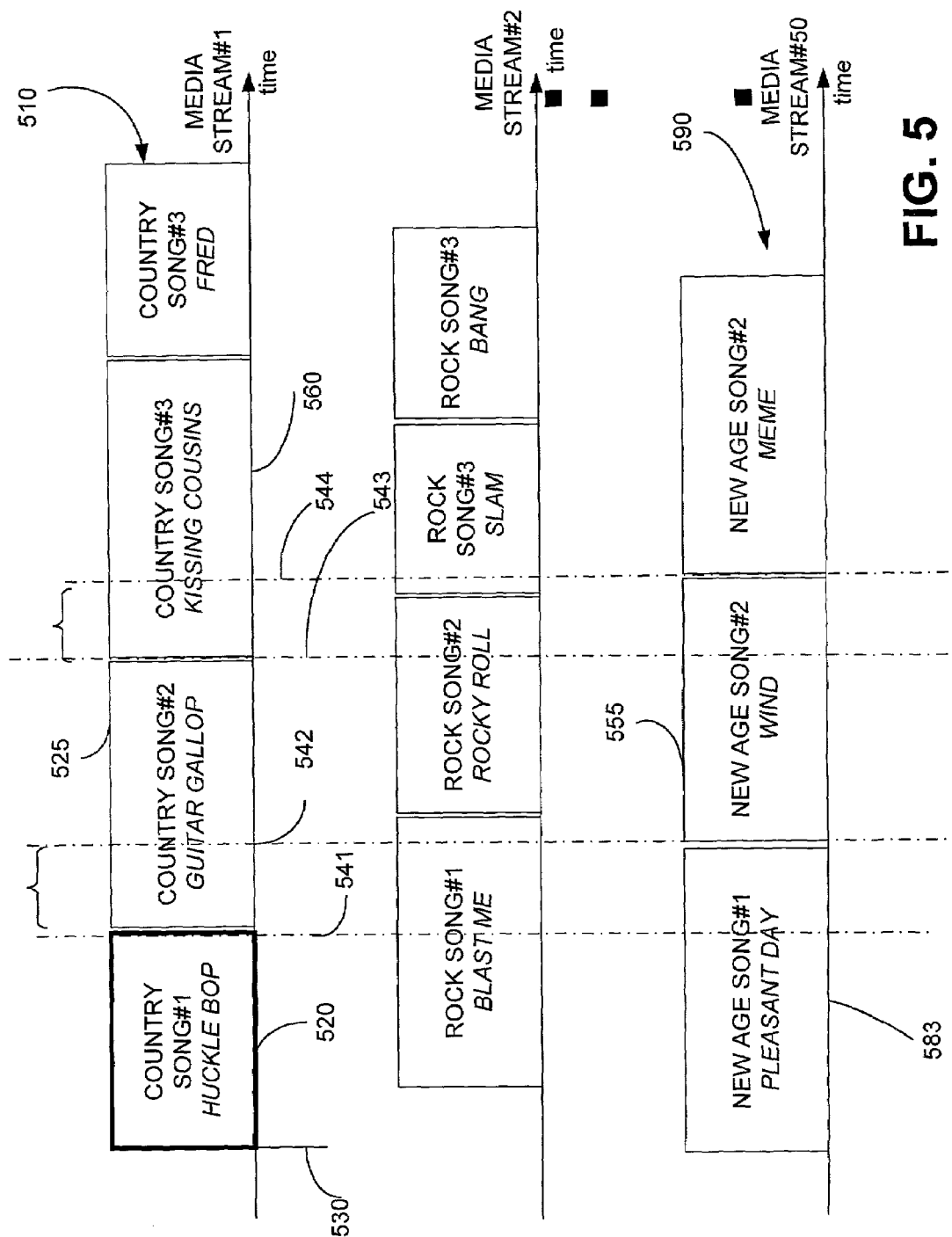
FIG. 5 illustrates the concept of media streams and the timing of media stream segueing among the plurality of media streams, in accordance with one embodiment of the present invention.

With continued reference to FIG. 2 and FIG. 4, FIG. 5 illustrates the concept of media streams. Step 480 (FIG. 4) includes searching through media information corresponding to media in a plurality of media streams, wherein the media information searched for corresponds to the configurations made by the user from pre-determined media information categories. These configurations are stored in data fields located in the define/priority data structure 298 located in the segue database 281 of the broadcast music application 283, or in alternative embodiments as described previously in association with the discussion for FIG. 2. As illustrated in FIG. 5, the media streams are a sequential supply of media provided by a media service, such as, by way of non-limiting example, a channel of broadcast music from a head end 11. For a non-limiting example, media stream #1 (510) may include a sequential supply of songs. Although the media streams are continual, assume a snapshot where a first media instance of media stream#1 510 is entitled Huckle Bop instance 520. Note that the Huckle Bop instance 520 has a start-time 530 and end time 541. Other media instances have different start and stop times generally, for music, but video and other media may be more synchronized with programming starting and stopping on the half-hour. The media information for the Huckle Bop instance 520 and other media among the media streams includes the start and end times and frequency (and/or other identifiers as necessary to distinguish the media among the media streams) for the corresponding media to enable the segue application 282, in cooperation with processor 244 and tuner system 245, to segue to the appropriate media instance. The media information is preferably sent via the QAM or QPSK channel in a separate transport stream such as MPEG-2 stream, or as a packet as in TCP/IP protocol, or any other manner of media transport as is well known to those skilled in the art. The media information may be downloaded from a media services server device to the broadcast music application 283, and updated either continually or, alternatively, as needed to remain current. The broadcast music application 283 stores the media information in the program information/schedule data structure 299 of the segue database 281 or alternatively in other locations as described previously in connection with FIG. 2.

For a non-limiting example, the user may have defined his or her media presentation in one or more user interface screens, as will be described later, with the following priority or rank: song titles ranked $1^{st}$, with selections under song titles Huckle Bop first and Kissing Cousins second within the song title category. New Age music is ranked second among the song genre media information category. New Age song Pleasant Day is excluded due to content deemed inappropriate by the user. These configurations are stored in the define/priority data structure 298 of the segue database 281. When the user starts the presentation, the segue application 282, based on these definitions or configurations stored in the define/priority data structure 298, will search the program information/schedule data structure 299 of the segue database 281 for media that has media information that corresponds to the media presentation the user defined. Specifically, the segue application 282 will search the program information/schedule data structure 299 for the desired or defined media that is currently in progress and upcoming among the plurality of media streams (Step 480 of FIG. 4). Note the distinction between methods employed in the computer arts, wherein the user manually searches through, for example, pre-configured favorites. The segue application 282 enables the user to define or configure one or more favorites, and then the segue application 282 automatically seeks these favorites out in the broadcast media streams and automatically tunes to these user defined favorites. For non-limiting example, assume the search by the segue application 282 resulted in the discovery of the user's first choice, i.e. Huckle Bop. The segue application 282 configures the processor 244 and the tuner system 245 to segue to media stream #1 (510) to enable the presentation of the Huckle Bop instance 520 (step 490).

The Huckle Bop instance 520 is now the current media or song of the media presentation in session. Segue application 282 also searches for the upcoming media corresponding to the user's custom media presentation. If no media matching any of the user's configurations are available by the end of the current media instance (e.g. the Huckle Bop instance 520) at end time 541, the current media stream continues with presentation of the Guitar Gallop instance 525 until a selected media is available, such as after the gap between 541 and 542. Since a genre selection (i.e. New Age music) was made in the present example, a switch to media stream #50 590 takes place at time 542 to begin the presentation of the Wind instance 555. Note that no switch to the Pleasant Day instance 583 in media stream #50 590 occurred after 541 since Pleasant Day is an excluded song. If Pleasant Day had not been excluded, the transition to media stream #50 590 would have happened at 541. The segue may be accomplished as a fade or a cross fade, or the start of the Wind instance 555 may begin abruptly after the abrupt end of the prior media instance, Guitar Gallop instance 525, or accomplished via any other method of fading as is well known in the art. Ranked media will generally be played out for the entire duration, at which time the segue application 282 will either enable the presentation of the next ranked media, searching from highest to lowest rank, or present a default (e.g. same media stream) as described earlier. Continuing with the present example, the Wind instance 555 is played until its end time 544, at which time the segue application 282 causes a switch from media stream #50 590 to media stream #1 510 to present the Kissing Cousins instance 560. The Kissing Cousins instance 560, already in progress, is ranked higher than the new age genre, and thus the switch takes place. As described earlier, the segue may take place via any known method of fading, but is not necessary. Alternatively, a user may desire to have presented the higher ranked media from the beginning of the higher ranked media instance. Such an embodiment would require that higher-ranking media are always presented from the start of its presentation, and would often require that media in progress would not be played in its entirety. In the present example, assuming the Wind instance 555 is in progress, and noting that the start time 543 of the Kissing Cousins instance 560 occurs before the end time 544 of the Wind instance 555, the segue application 282 may cause a segue from the Wind instance 555 to media stream #1 510 to present higher ranked Kissing Cousins at the Kissing Cousins instance 560 start time 543. The result would be that the end of the Wind instance 555 would not be presented. As an alternative embodiment, buffering may be employed in memory to enable the beginning of the higher ranked media instances to be played in situations of overlapping presentation times between selections, such as between times 543 and 544. Alternatively, buffering may be employed to cache the end of one song and the beginning of the next, or alternatively, play out the end of one song and cache in the next song. Of course, because of the delay caused by buffering, subsequent time adjustments would be made by the segue application 282 in presenting future media.

FIGS. 6-27 depict examples of user interface screens for interacting with the broadcast music application 283. The segue application 282 configures the processor 244 to provide the user (step 450, FIG. 4) with a user interface to display selection options for the user. With reference to FIG. 2, as with other user interface screen display examples discussed below, processor 244 executes program instructions of the segue application 282 that cause it to direct the window manager 259 to create a user interface screen display via display data that is formatted for television 241. Processor 244 stores the display data or parts thereof in DRAM 252 (as necessary) and transfers the display data to a display output system such as output system 248 wherein display data is converted to respective television signals and transmitted to television 241. Of course, the scope of the preferred embodiment of the present invention also includes any other method of causing the described user interface screen displays to appear to the user.

Once the user interface screen is presented to the user, the next step 460 in FIG. 4 is interacting with the user to define the media presentations at the user interface. Prompts (e.g. selections, instructional text messages, etc.) within the user interface screens will enable the user to decide (step 470) if the user wants to present (and thus go to step 480) or be presented with a user interface (step 450) to continue to define or configure their custom media presentation step 460. The example user interface screen display 600 (FIG. 6) in the preferred embodiment fills the entire television screen, but could also be a window composed on part of the television display over top of other windows. The example user interface screen display 600 includes a title header 601 common to all of the broadcast music application 283 interface screens. Below the title header 601 is a subtitle header 605 that is descriptive of elements below subtitle header 605. Channel list 630 includes a list, for non-limiting example, of all of the channel titles and their respective channel numbers available through the broadcast music application 283. Channel list 630 also includes open channel designations with channel number and pre-set default titles, for example "My Channel #1 115" as shown in highlighted window 635, for custom media presentations, also referred to as "my channels". For non-limiting example, John Doe may have a my channel #1 comprising music for parties. John Doe may also have a my channel #2 comprising music for dinner. There may also be several users' my channels listed, such as Mary Doe's party mix music under my channel #8. The channel titles for my channels may be edited by the user, as described below. Each channel window 637 of channel list 630 contains the corresponding channel title and channel number, as described above. Channel list 630 also includes highlighted window 635, which may be scrolled up and down the media stream list 630 by up and down arrows 640 and 645, respectively. Alternatively, the highlighted window 635 may be fixed, and the up and down arrows 640 and 645, respectively, may cause the channel windows 637 with their corresponding channels and channel titles to advance through the highlighted window 635. Up arrow 640 and down arrow 645 suggest to the user a one-to-one functional correspondence to up and down arrows 383 and 384, respectively, on remote control device 380. Likewise, select button 650, located between up and down arrows 640 and 645, suggest a one-to-one functional correspondence with select button 387 on the remote control device 380. Select button 650 is used to select the desired channel in the highlighted window 635.

Current selections screen 620 displays the channel title and channel number corresponding to the channel in highlighted window 635, and the selections contained therein. Current selections screen 620 may also display textual instructions that guide the user on the use of the user interface screen 600, and are responsive to user selections. Current selections screen 620 alternatively may be an interactive display that the user may interact with to make additions or other changes to the selections located within the current selections screen. For non-limiting example, current selections screen 620 may accept user input directly, as opposed to simply displaying selections made with the user interface buttons or arrows. Bottom header 660 is located at the bottom of example first user interface screen display 600. Bottom header 660 includes service guide button 662 and configure my channel button 666. Service guide button 662 and configure my channel button 666 have counterpart buttons on remote control device 380. The "A" service guide button 662 corresponds to "A" button 388 on the remote control device 380. The "C" configure my channel button 666 corresponds to "C" button 390 on remote control device 380. A user may wish to configure a custom channel (or my channel) for the first time, and thus selects the "C" configure my channel button 666.

Figure 6:
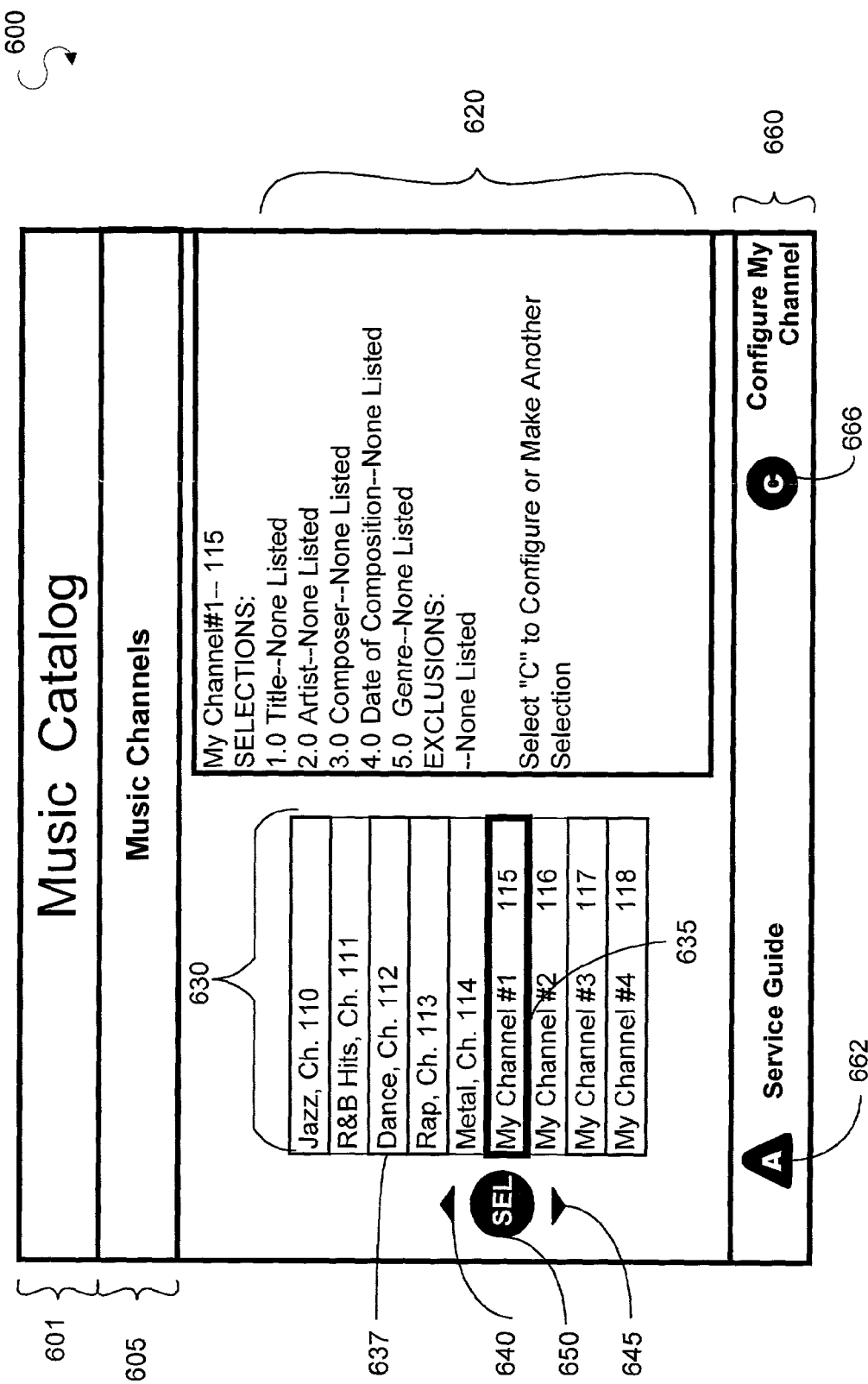
FIG. 6 is an example screen display that depicts one example music application interface screen.
Figure 7:
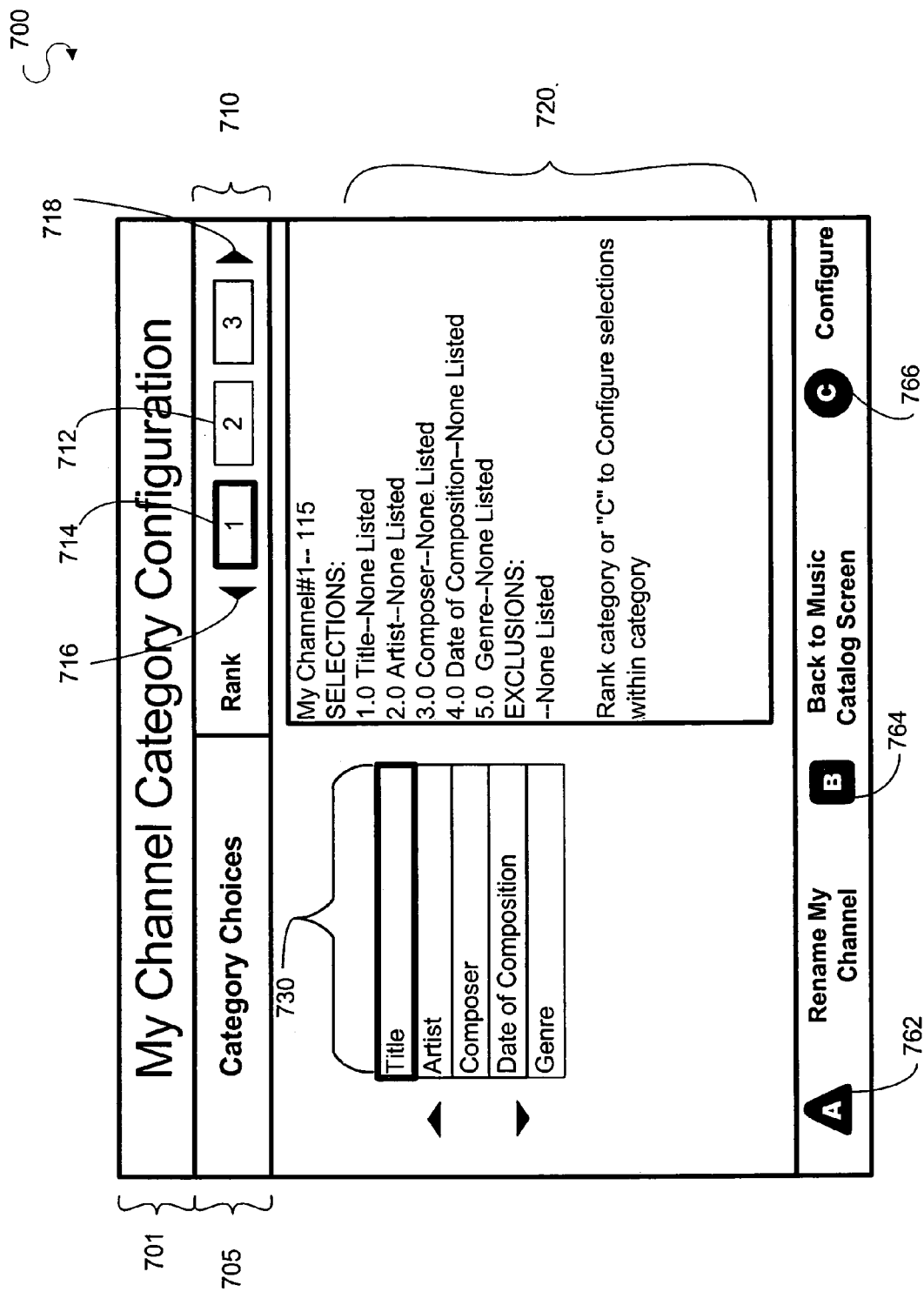
FIG. 7 is an example user interface screen responsive to user selecting the configure my channel button in the example user interface screen in FIG. 6.

FIG. 7 is an example user interface screen 700 responsive to user selecting the "C" configure my channel button 666 in example user interface screen 600 (FIG. 6). Title header 701 suggests the purpose of the example user interface screen 700, that is, to configure desired media information categories. Subtitle header 705 identifies the category list 730 below subtitle header 705. Rank index 710 includes rank windows 712 that contain numbers for ranking, or prioritizing, media information categories within the category list 730, and a rank highlighted window 714 for highlighting the rank corresponding to the category highlighted in the category list 630 of FIG. 6. Upon initial entry into example user interface screen 700, rank index 710 defaults to the highest priority (i.e. "1") as shown in rank highlighted window 714. Rank index 710 is used to change the rank, or priority, of the media information categories in the category list 730, as will be illustrated in FIG. 8 and FIG. 9. Rank index 710 may preferably have a pre-selected maximum rank corresponding to the quantity of media information categories listed in category list 730. Alternatively, rank index 710 may have a dynamic maximum rank corresponding to one plus the amount of categories with user configurations contained within (for example, from previous configurations), or other variations. Left and right arrow buttons, 716 and 718, respectively, advance rank highlighted window 714 to the left or right, respectively. Left and right arrows, 716 and 718, respectively, suggest a one-to-one functional correspondence to the left and right arrows 385 and 386, respectively, on the remote control device 380. Similar to the channel list 630 in FIG. 6, and as is true with all indexes in the example user interface screens, scrolling through the rank index 710 is accomplished by advancing the rank highlighted window 714 to the left or right until the desired rank is highlighted. Alternatively, the rank highlighted window 714 may be fixed and the rank windows 712 with their corresponding rank are advanced through the rank highlighted window 714. Advancing to the right of the rank index 710 causes a maximum rank to be reached. Alternatively, advancing to the right of the rank index 710 may result in reaching the first rank, as in a continual or repeating fashion.

Category list 730 lists the media information categories a user may choose from, including, by default order, from narrowest category to broadest: title, artist, composer, date of composition, and genre. Alternatively, other categories may be listed, for non-limiting example, album title. Of course, the categories need to be discernible from information downloaded from the head end 11 via the broadcast music application 283. Current selections screen 720 displays the current selections corresponding to the media presentation or "my channel" selected from the channel list 630 (in FIG. 6), in this non-limiting example, "my channel #1". The default screen for a newly created "my channel" is as displayed in current selection screen 720. Alternatively, the default screen may take on many different embodiments such as a blank screen with instructional guides, etc. As this is the first my channel, the title is my channel #1 and the corresponding channel number "115". The channel number (e.g. "115") denotes that the user may preferably simply input the channel number (e.g. "115") in the remote, as with other channels, to start the media presentation corresponding to that channel number. As this media presentation is newly created, the fact that no selections or exclusions exist is indicated in current selections screen 720. Text messages appear in current selections screen 720 to guide the user on the appropriate use of example user interface screen 700. "A" rename my channel button 762 enables a user to identify the media presentation by any identifier the user chooses. For instance, if the user does not want the media presentation to be named "my channel #1", they select the "A" rename my channel button 762 and another screen (not shown) will allow them to input an identifier, such as, for non-limiting example, "John's party mix channel", according to one of various methods well-known in the art for entering text from an input device. The "B" back to music catalog screen button 764 enables the user to go back to the example user interface screen 600. The "C" configure button 766 enables the user to configure selections within each category. As described in association with first user interface screen 600, "A", "B", and "C" buttons 762, 764, and 766, respectively, have a one-to-one functional correspondence with remote control device "A" 388, "B" 389, and "C" buttons 390, respectively.

Figure 8:
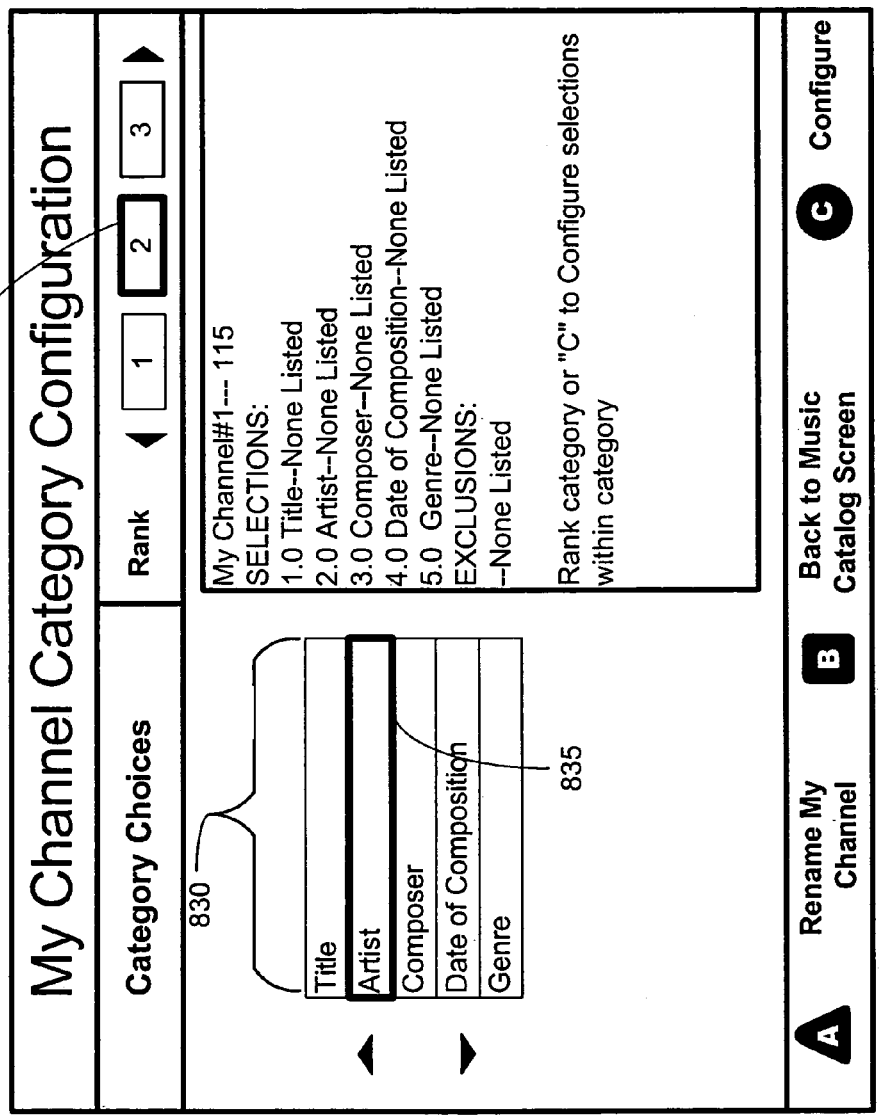
FIG. 8 is an example user interface screen illustrating that scrolling to the media information category "artist" will cause a corresponding scroll in the rank index that reflects the order of priority.

FIG. 8 is an example user interface screen 800 illustrating that scrolling to the media information category "artist" in category list 830 will cause a corresponding scroll in the rank index 810 to rank "2", which reflects the order of priority. For non-limiting example, since the media information category "artist" is prioritized as second, scrolling the highlighted window 835 from "title" to "artist" causes the rank highlighted window 814 in rank index 810 to advance from rank "1" to rank "2".

Figure 9:
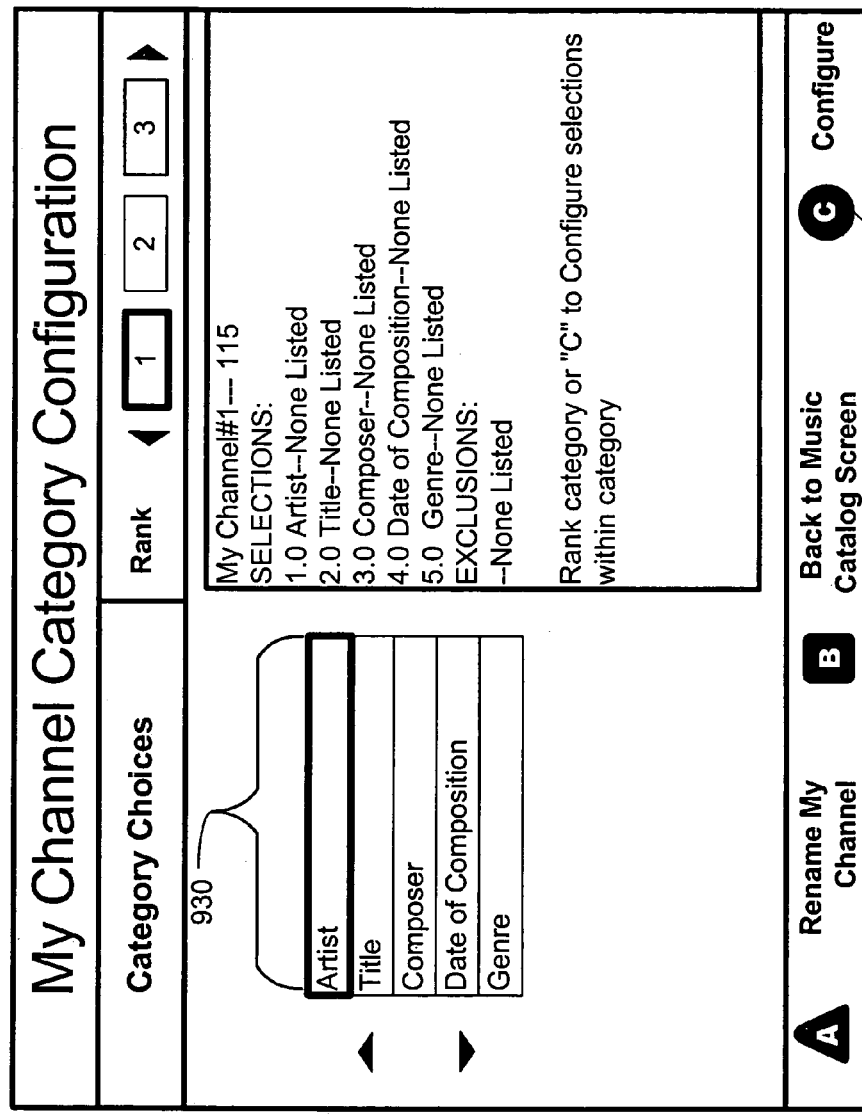
FIG. 9 is an example user interface screen responsive to the user selecting a rank of "1" for media information category "artist".

FIG. 9 is an example user interface screen 900 responsive to the user selecting a rank of "1" for media information category "artist". As shown, the media information category "artist" advances up one window space in the category list 930, wherein the media information category previously assigned a rank "1" (e.g. "title") moves to the second position in priority in the category list 930.

Figure 10:
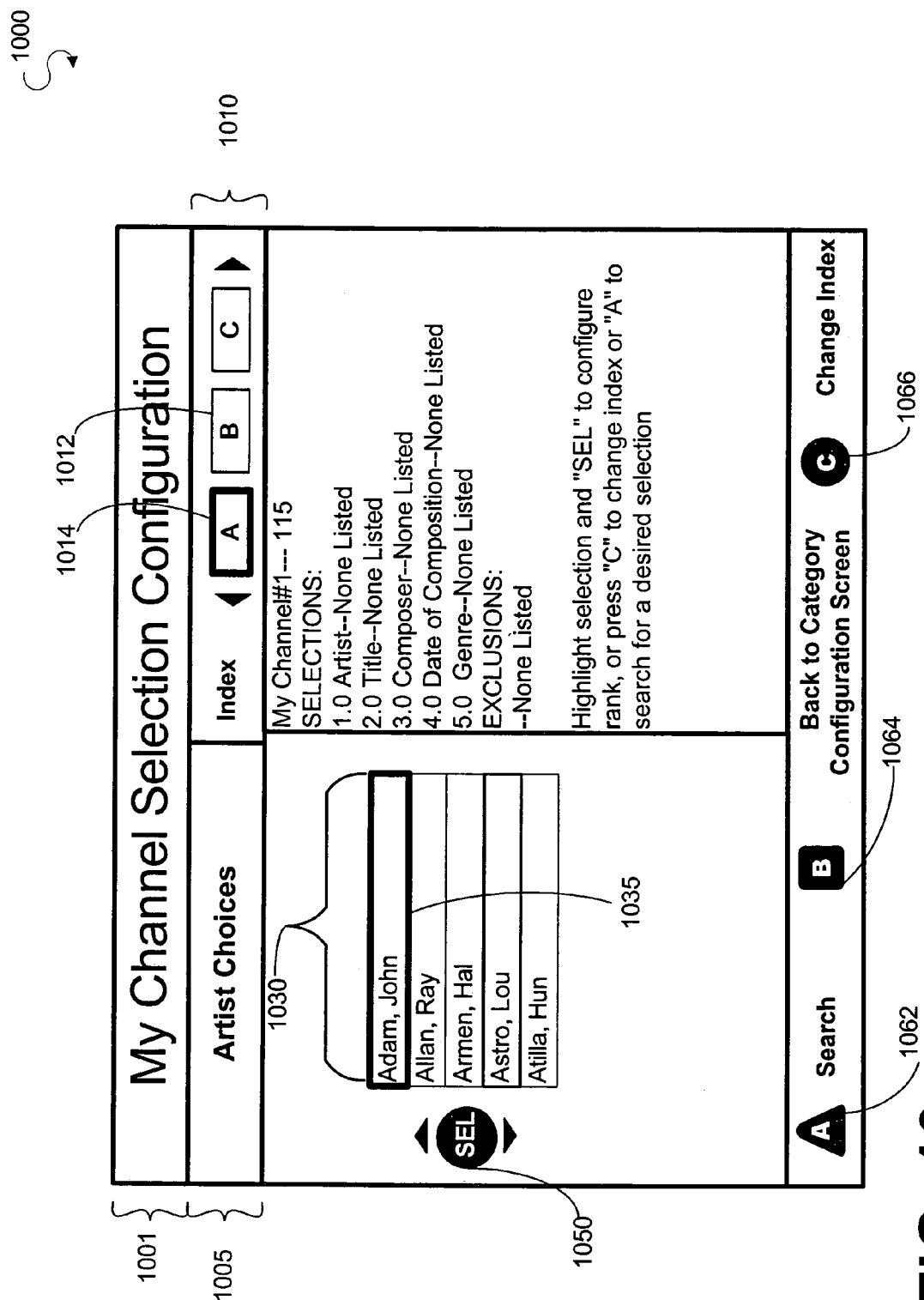
FIG. 10 is an example user interface screen responsive to user selecting the "C" configure button in the user interface screen of FIG. 9.

FIG. 10 is an example user interface screen 1000 responsive to user selecting the "C" configure button 966 in the user interface screen 900 of FIG. 9. Title header 1001 responsively changes to "My Channel Selection Configuration". Subtitle header 1005 responsively changes to "artist choices". Increment index 1010 appears in place of the rank index 910 of FIG. 9. Increment index 1010 includes index windows 1012 that contain letters or numbers corresponding to indexing manner in which the user wants to scroll through the selection list 1030, as will be described in more detail shortly. Increment index 1010 includes a index highlighted window 1014 that defaults to the first letter or number in the increment index 1010, for a non-limiting example, "A" as highlighted by index highlighted window 1014. Increment index 1010 enables a user to advance the selection list 1030 corresponding to the letter or number highlighted with index highlighted window 1014 in the increment index 1010. For non-limiting example, highlighting "A" in the increment index 1010 causes "artist" category selections in the selections list 1030 to appear in alphabetical order starting with the letter "A". "C" change index button 1066 enables the user to change the index increment through another user interface screen (not shown). For non-limiting example, the index increment options may include a-e, f-j, etc, or any other combination of letters or numbers. Alternatively, selecting the "C" change index button 1066 may cause the increment index 1010 to display the next option of index increments in the index windows 1012. The user may use the "C" change index button 1066 as a method to scroll through the various indexing options. Alternatively, there may be drop down menus within the increment index 1010 that provides a choice of index increments. The "A" search button 1062 enables the user to search for a selection by entering the selection by keying in the selection, according to well-known methods in the art. The "B" back to category configuration screen button 1064 returns the user to the my channel category configuration screen, for example, example user interface screen 900 (FIG. 9). In this non-limiting example, the user decides to select "Adam, John" in the selections list 1030 as their desired artist. The user highlights "Adam, John" with highlighted window 1035 and selects the select button 1050. The user is now advanced to the example user interface screen 1100.

Figure 11:
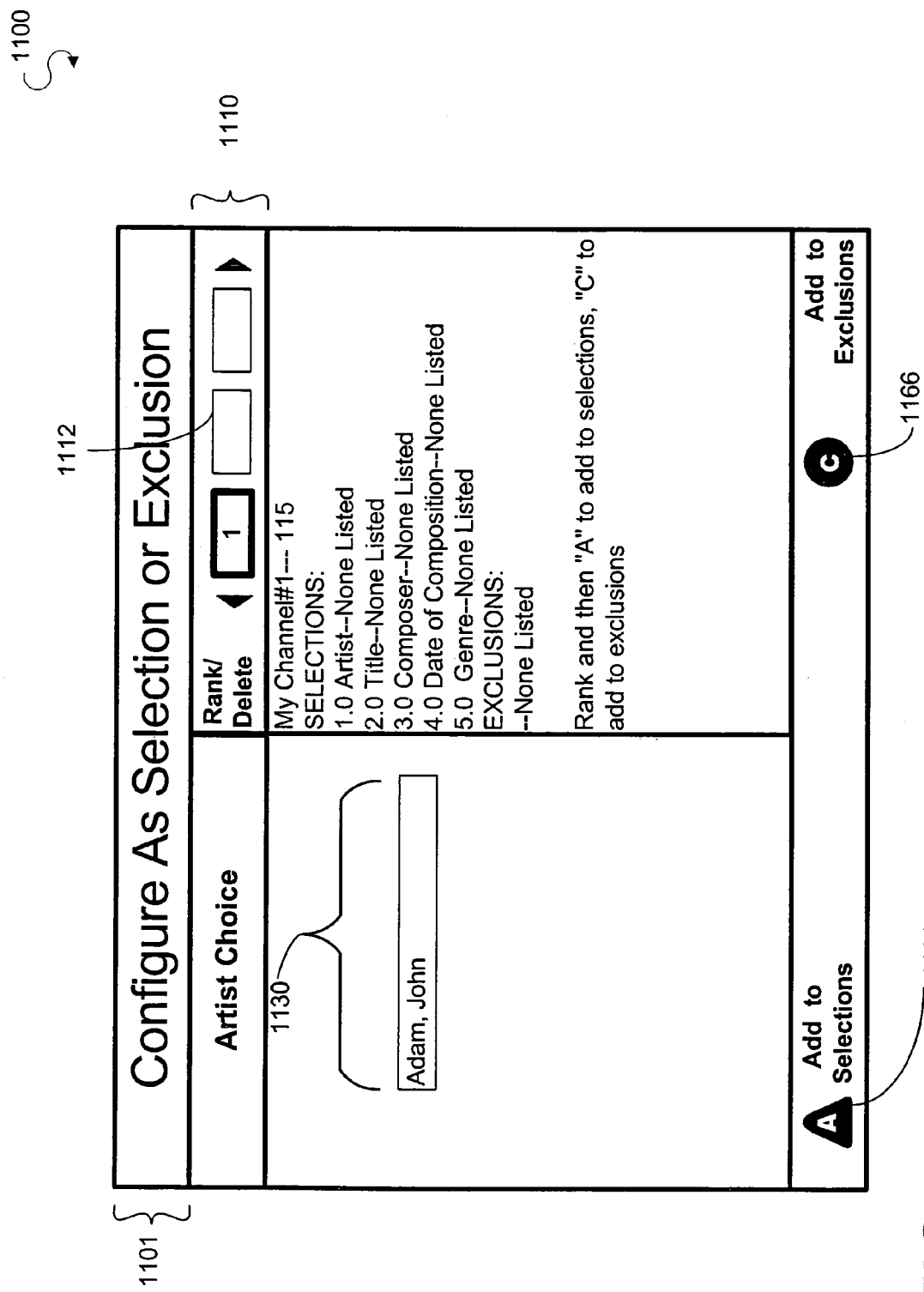
FIG. 11 is an example user interface screen responsive to user selecting the select button in the example user interface screen of FIG. 10.

FIG. 11 is an example user interface screen responsive to user selecting the select button 1050 in example user interface screen 1000 (FIG. 10). Title header 1101 responsively changes to "configure as selection or exclusion". Rank/delete index 1110 appears in place of increment index 1010 of example user interface screen 1000 (FIG. 10). "A" add to selections button 1164 enables the user to add the selection in choice window 1130 to the media presentation my channel #1 under the "artist" category. "C" add to exclusions button 1166 enables the user to exclude any media corresponding to the selection in the choice window 1130 from being presented. For instance, the user may choose to exclude the selection due to content or subject matter deemed by the user as inappropriate or offensive. The exclusion would take precedence over any ranked selection, ensuring that the corresponding content is excluded despite an inconsistent selection. Alternatively, in other embodiments these inconsistencies may be resolved in a different manner. For a non-limiting example, the user may be presented with a user interface screen that provides for negative preferences, or alternatively, ranked negative preferences, instead of absolute exclusions. For instance, if a desired media selection is not available, play songs of one category before playing songs in another category. Note that rank/delete index 1110 defaults to one rank greater than the rank of the last current selection under the category chosen, unless the selection in the choice window 1130 is the same as a selection in the current selections window, as will be described later in association with the delete function. In this non-limiting example, "Adam, John" is the user's first selection, and thus the default rank will be "1". Note that "DEL" does not yet appear in any index window 1112 of the rank/delete index 1110, as there is nothing to delete.

Figure 12:
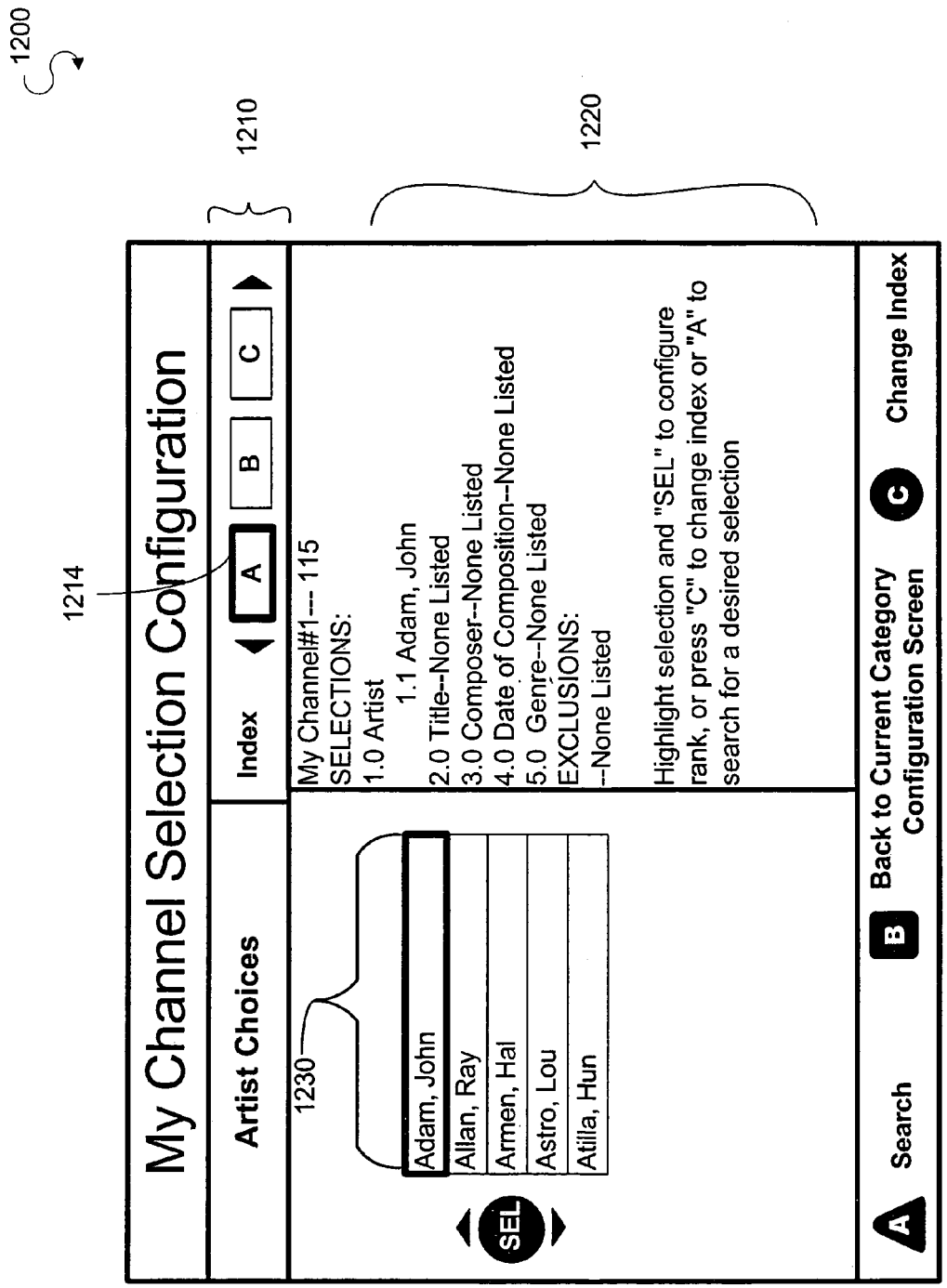
FIG. 12 is an example user interface screen responsive to the user selecting the "A" add selection button in the example user interface screen of FIG. 11.

FIG. 12 is an example user interface screen 1200 responsive to the user selecting the "A" add selection button 1164 in the example user interface screen 1100 (FIG. 11). The screen returns to the format of a "my channel selection configuration screen", similar to example user interface screen 1000 (FIG. 10). Note that the increment index 1210 defaults to the first index letter, as shown in this non-limiting example with "A" contained in index highlighted window 1214. Also, the default selection in the selection list 1230 is the first alphabetical (or numerical) selection corresponding to the first letter (or number), in the increment index 1210. Current selections screen 1220 reflects the added selection, placing the added selection under the corresponding category with the rank as configured in the example user interface screen 1100 (FIG. 11). For non-limiting example, "Adam, John" is placed under the "artist" category with the highest ranking of "1", and thus ranked "1.1" corresponding to the artist category of rank "1" and "Adam, John" of rank "1".

Figure 13:
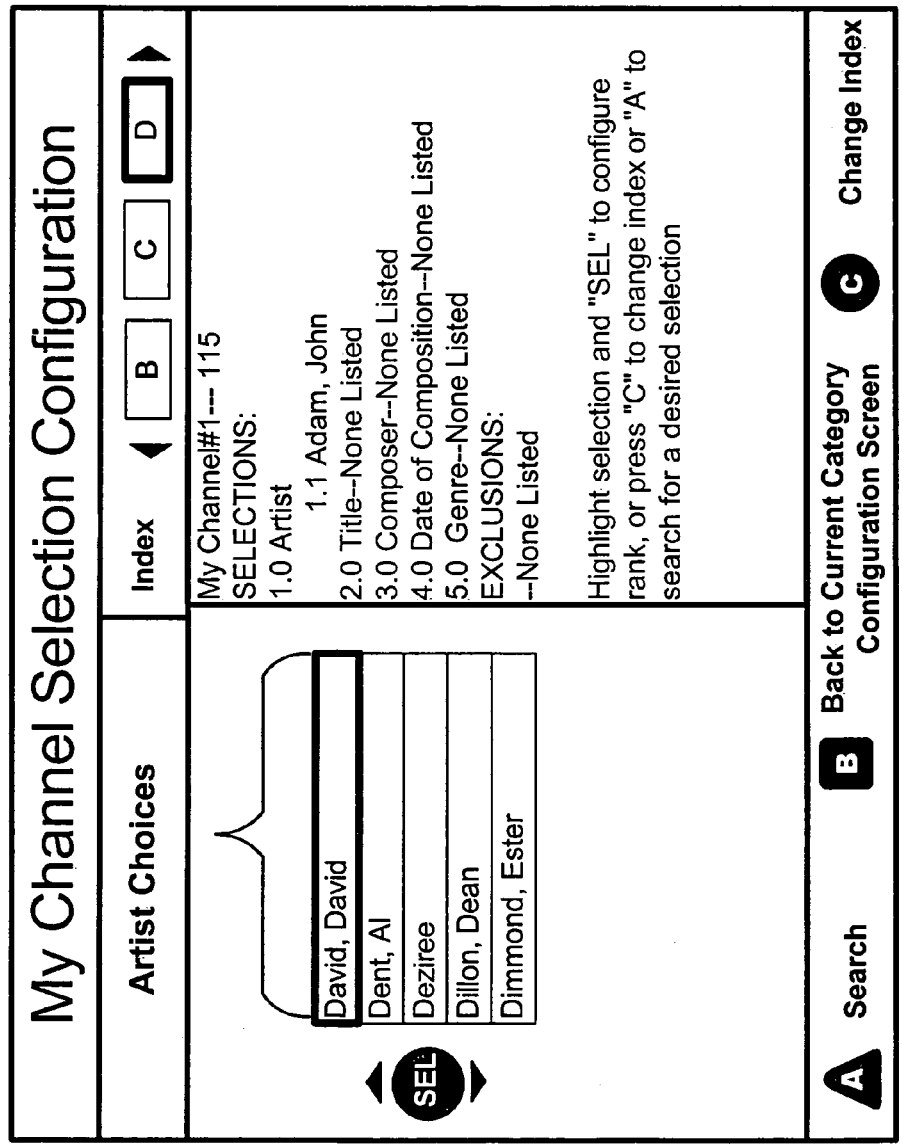
FIG. 13 is an example user interface screen responsive to the user scrolling the increment index to the letter "D".
Figure 15:
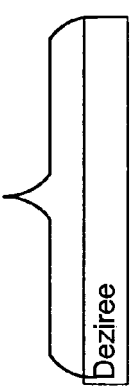
FIG. 15 is an example user interface screen responsive to the user selecting the select button in the example user interface screen of FIG. 14 in order to either exclude or include artist "Deziree".
Figure 17:
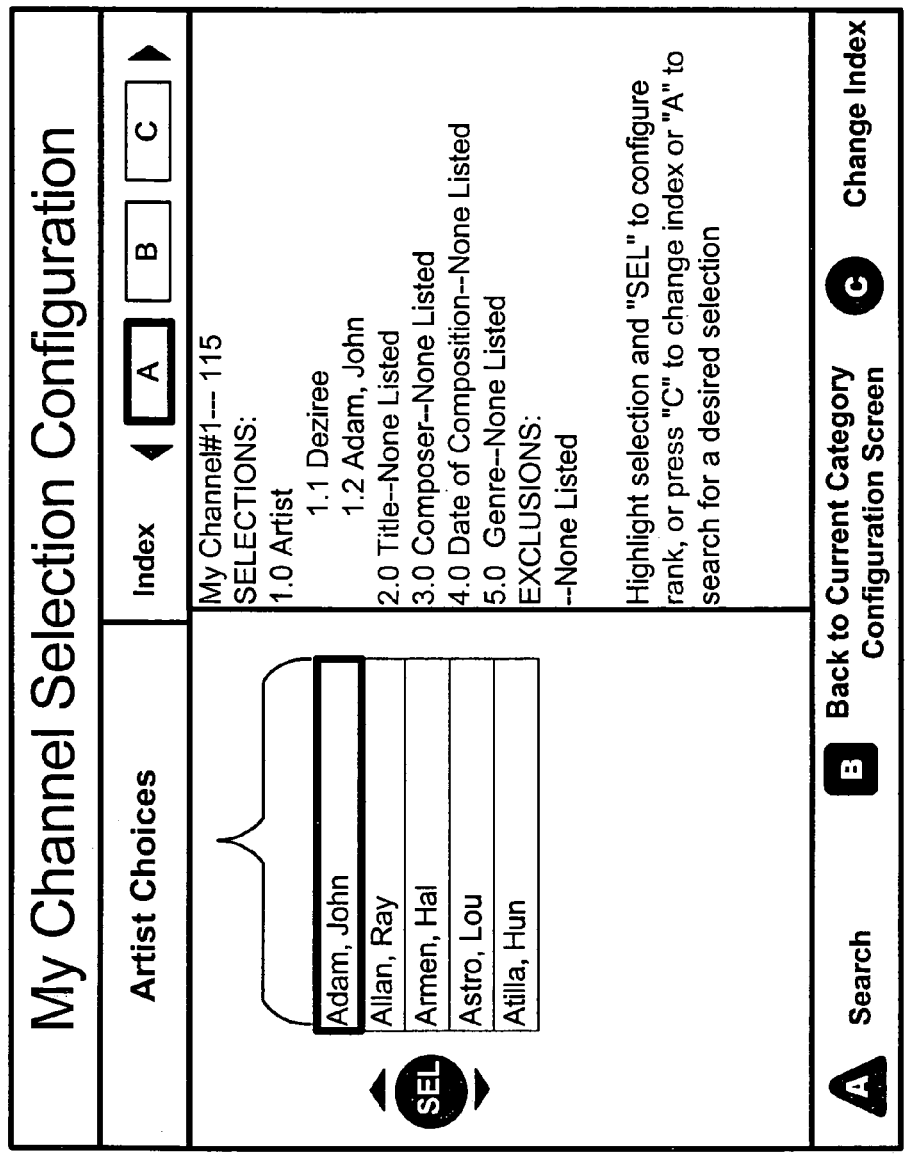
FIG. 17 is an example user interface screen responsive to the user selecting the "A" add to selections button in the example user interface screen of FIG. 16.

FIG. 13 is an example user interface screen 1300 responsive to the user scrolling through the increment index 1310 to the letter "D", which the user would presumably do if the user is interested in entering another artist beginning with the letter "D" in the media presentation. FIG. 14 is an example user interface screen 1400 responsive to the user scrolling highlighted window 1435 to the artist called "Deziree". FIG. 15 is an example user interface screen 1500 responsive to the user selecting the select button 1450 in the example user interface screen 1400 in order to either exclude or include artist "Deziree". Rank/Delete index 1510 defaults to the next highest priority corresponding to selections under the "artist" category. Note that "DEL" appears in the next rank/delete window 1512 after the rank "2", as there are now selections that could be deleted. FIG. 16 is an example user interface screen 1600 responsive to the user scrolling the rank/delete highlighted window 1614 to the rank of "1". Thus, the user seeks to rank the artist "Deziree" higher than "Adam, John". FIG. 17 is an example user interface screen 1700 responsive to the user selecting the "A" add to selections button 1664 in the example user interface screen 1600. Artist "Deziree" displaced "Adam, John" as the first ranked artist, as shown in the current selections screen 1720. Artist "Deziree" thus has a rank of "1.1" corresponding to the highest rank "1" within the highest ranked category "1" of "artists". User now seeks to exclude an artist.

Figure 18:
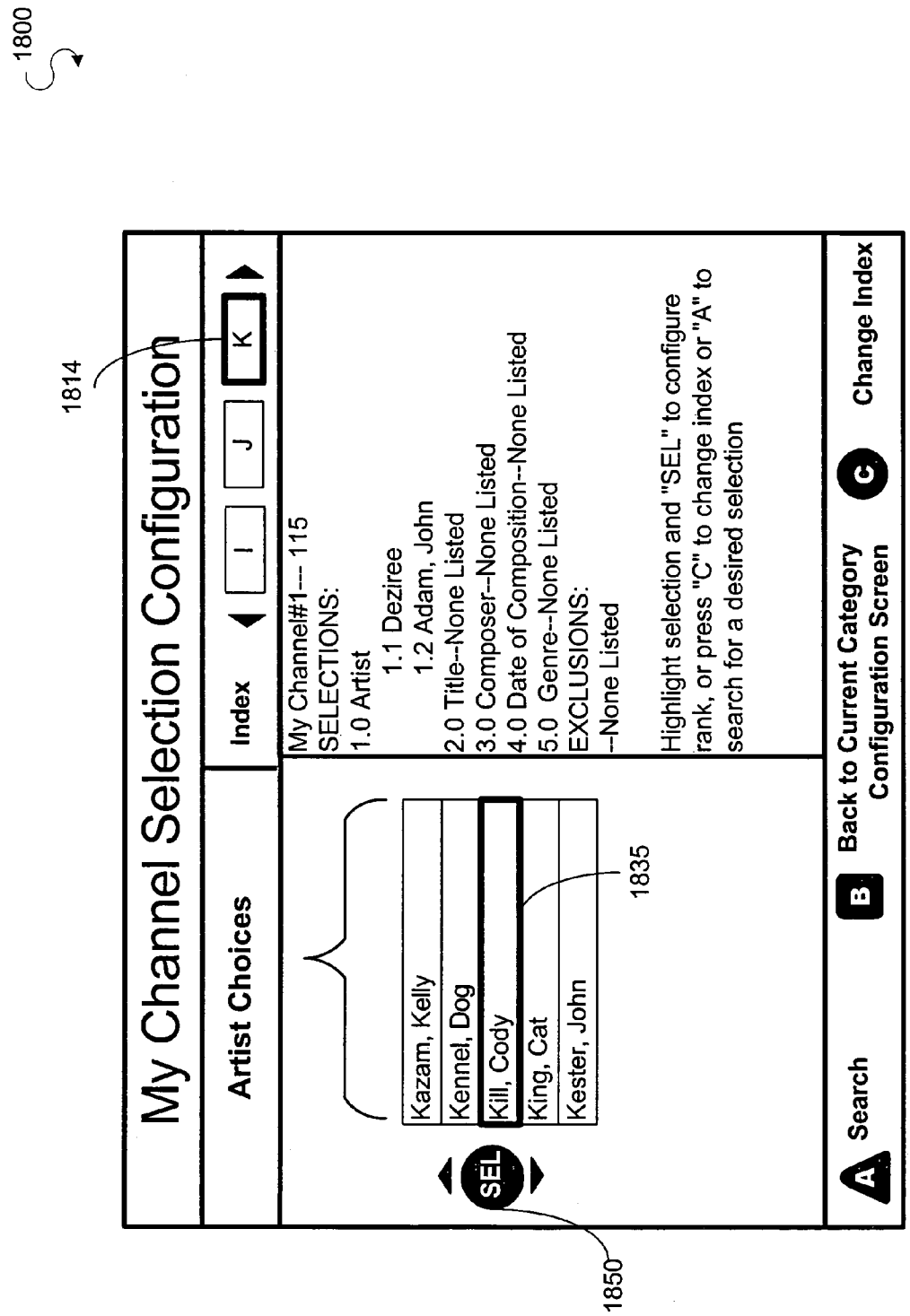
FIG. 18 is an example user interface screen responsive to the user scrolling the index highlighted window to the letter "K".
Figure 20:
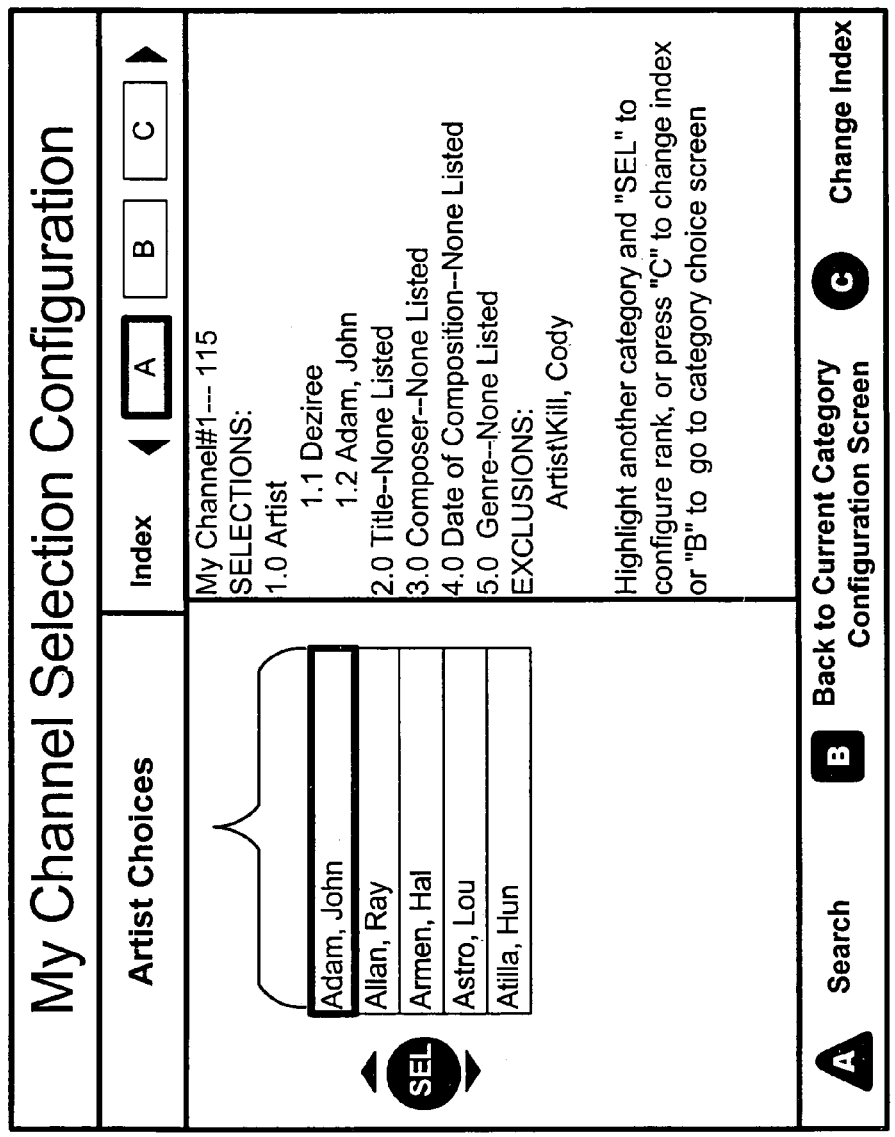
FIG. 20 is an example user interface screen responsive to the user selecting the "C" add to exclusions button in the user interface screen of FIG. 19.

FIG. 18 is an example user interface screen 1800 responsive to the user scrolling the index highlighted window 1814 to the letter "K", as the artist they desire to exclude has a last name that begins with the letter "K". Assuming that scrolling the index highlighted window 1814 to "K" resulted in the index highlighted window 1835 highlighting the first selection alphabetically for artists with the last name beginning with "K" (as is a typical default), the user scrolls highlighted window 1835 to the artist selection "Kill, Cody". FIG. 19 is an example user interface screen 1900 responsive to the user selecting the select button 1850 in user interface screen 1800. Artist selection "Kill, Cody" appears in choice window 1930. The rank of "3" is automatically highlighted in rank index 1910 because there exists two prior selections in the artist category. User desires to exclude this selection, so the user will select the "C" add to exclusions button 1966. FIG. 20 is an example user interface screen 2000 responsive to the user selecting the "C" add to exclusions button 1966 in the user interface screen 1900. As noted in the current selections screen 2020, excluded artist "Kill, Cody" is located under the "Exclusions" portion of the current selections screen 2020, with the format of media information category, backslash, and selection under that category. Alternative formats, such as, for example, the use of hyphens are possible.

Figure 21:
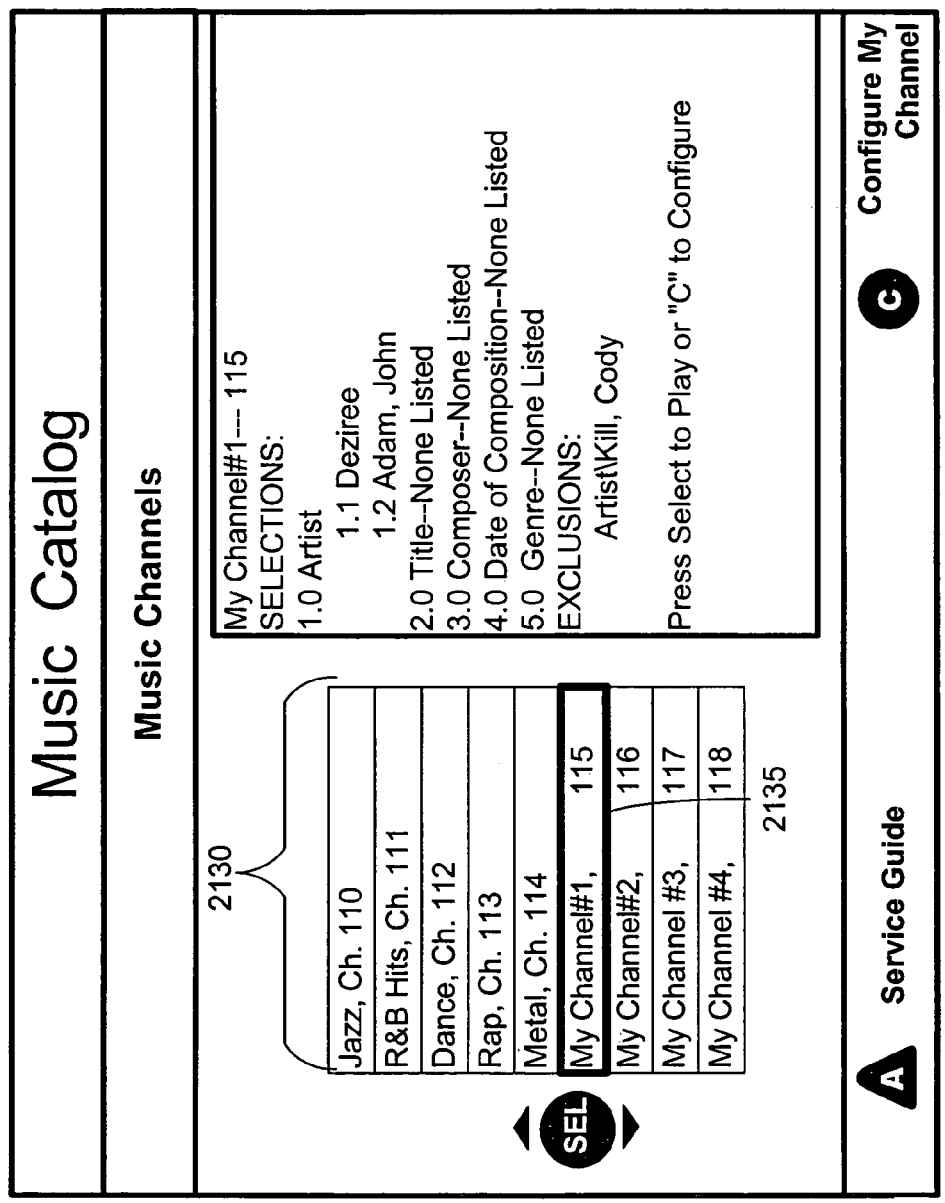
FIG. 21 is an example user interface screen responsive to the user navigating his or her way back to the "Music Catalog" screen to view the channel list.

FIG. 21 is an example user interface screen 2100 responsive to the user navigating his or her way back to the "Music Catalog" screen to view the channel list 2130. Although returning to this screen (through the use of "B" back buttons in the preceding screens) may cause the highlighted window 2135 to be located on the first selection in the channel list 2130, assume the user scrolled to the "my channel#1" selection in the channel list 2130, or that it defaulted, in other implementations, there after moving backwards. The current selections screen 2120 displays the configured selections, or configurations, for the corresponding media presentation.

Figure 22:
FIG. 22 is an example user interface screen responsive to the user highlighting the my channel#1 selection in the channel list in the example user interface screen of FIG. 21.
Figure 23:
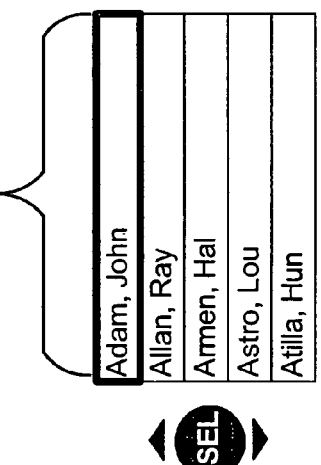
FIG. 23 is an example user interface screen responsive to the user selecting the "C" configure button in example user interface screen of FIG. 22.
Figure 25:
FIG. 25 is an example user interface screen responsive to the user selecting "DEL" in the example user interface screen of FIG. 24.

FIG. 22 is an example user interface screen 2200 responsive to the user highlighting the "my channel#1" selection in the channel list 2130 in example user interface screen 2100. The user seeks to delete artist "Adam, John" from the media presentation corresponding to the "my channel#1". As described earlier, highlighted windows 2214 and 2235 default to the highest priority ranks and categories, respectively. FIG. 23 is an example user interface screen 2300 responsive to the user selecting the "C" configure button 2266 in example user interface screen 2200. Since "Adam, John" is the first artist choice in the selection list 2330, the user does not need to search any further. FIG. 24 is an example user interface screen 2400 responsive to the user selecting the select button 2350 in the example user interface screen 2300. Note that the rank is not "3" but "2", since the selection "Adam, John" is currently a selection in the artist category. User scrolls the rank/delete highlighted window 2414 to "DEL" in the rank/delete index 2410 to delete the selection. FIG. 25 is an example user interface screen 2500 responsive to the user selecting "DEL" in the example user interface screen 2400. Note that artist "Adam, John" is now cleared from the current selections screen 2520.

Figure 26:
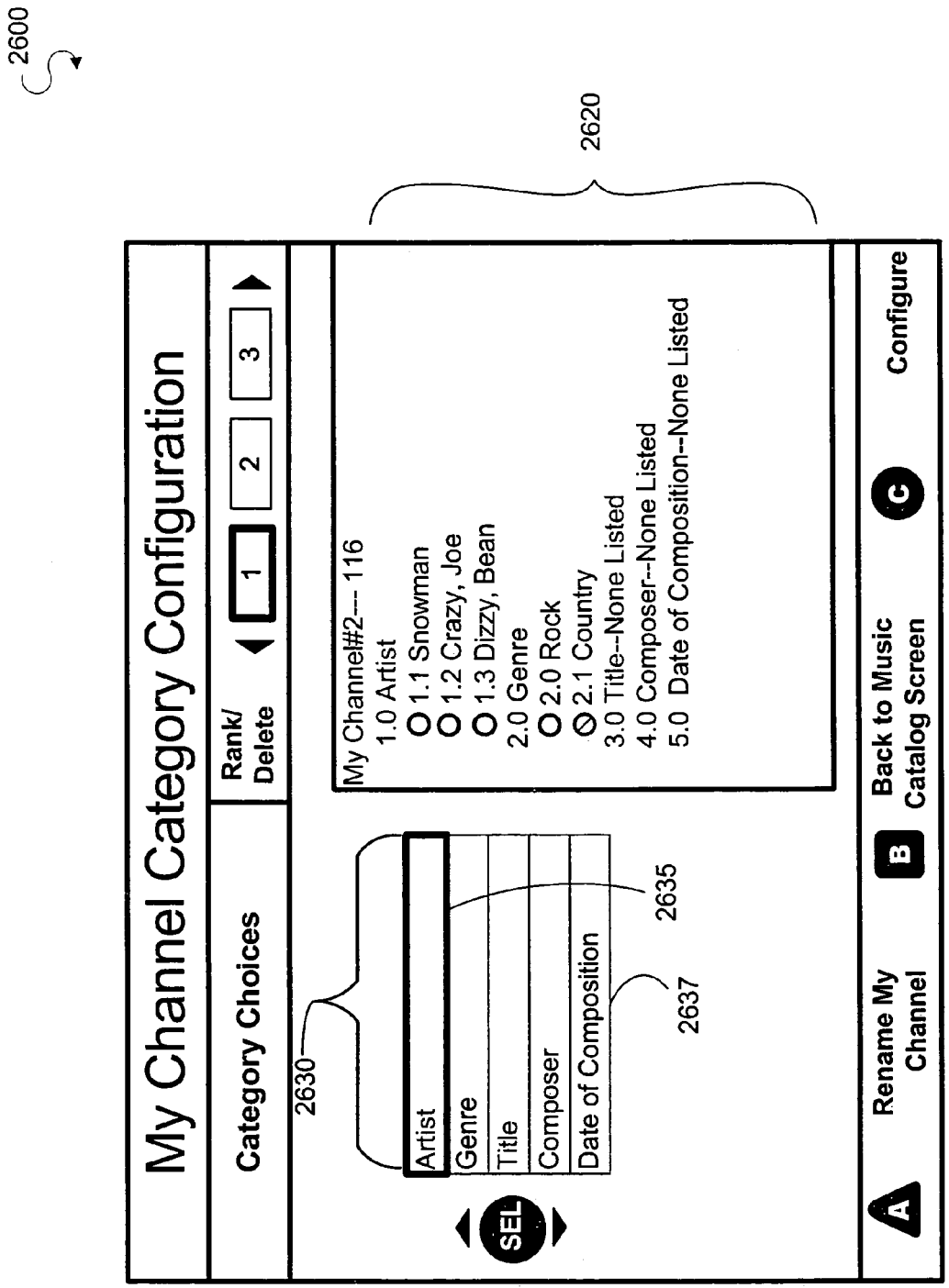
FIG. 26 is an example alternate embodiment user interface screen illustrating the use of icons to designate whether a selection displayed in the current selections screen is excluded or included from the media presentation.

FIG. 26 is an example alternate embodiment user interface screen 2600 illustrating the use of icons to designate whether a selection displayed in the current selections screen 2620 is excluded or included from the media presentation. The icons may take the form of any symbol to distinguish between included and excluded selections.

Note that ranking broad media information categories, such as, by way of non-limiting example, "genre", with the highest rank ("1") causes a media presentation whereby media presentations lower in rank may not be presented. As described earlier, the user interface screens format the media information categories from narrowest to broadest in a way to encourage, yet not restrict, users to maintain the ranks of the categories. Users who change the rank of the media information categories may experience this scenario first hand and adjust accordingly.

The user's configurations contained within the define/priority data structure 298 located in the segue database 281 may be communicated to the head end 11. The head end 11 may use this information to generate a program guide that alerts the user to upcoming user-preferred media available throughout the day. Further, the head end may use this information for market research gathering, as a way, for a non-limiting example, to gauge user demand for certain media or media services and provide media services and media to users that more closely match the wants and needs of users.

The segue application 282 of the present invention can be implemented in hardware, software, firmware, or a combination thereof. In the preferred embodiment(s), the segue application 282 is implemented in software or firmware that is stored in a memory and that is executed by a suitable instruction execution system. If implemented in hardware, as in an alternative embodiment, the segue application 282 can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The segue application 282, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A media system, comprising:
   a memory to store media information characterizing media instances to be provided among a plurality of media streams; and
   a processor configured to execute logic to:
   provide a user interface, wherein the user interface is configured as a plurality of screen displays, to enable a user to create, define and modify a media presentation of the media instances from the plurality of media streams, in advance of a time corresponding to the media presentation, by ranking media information categories and by selecting and ranking desired media information within at least one of the media information categories;
   continually and automatically segue media stream changes among the plurality of the media streams containing the media instances;
   dynamically extract from the segued media streams the media instances to present a user defined media presentation according to a defined order of the media instances based on the ranked media information categories and the selection and ranking of the desired media information within the at least one of the media information categories; and
   segueing to an upcoming media instance before an end time of a ranked in-progress media instance if the upcoming media instance is of higher rank than the ranked in-progress media instance and if the upcoming media instance has a start time that is before the end time of the ranked in-progress media instance.

2. The system of claim 1, wherein the processor and the memory are resident in a media services client device.

3. The system of claim 1, wherein the processor and the memory are resident in a media services server device.

4. The system of claim 1, wherein the media instances correspond to broadcast music.

5. The system of claim 4, wherein the media information are selected from a group consisting of genre, song title, song artist, composer, and date of composition.

6. The system of claim 1, wherein the screen displays comprise a displayed list of the media information.

7. The system of claim 1, wherein the media information is categorized by the media information categories.

8. The system of claim 7, wherein the user interface is configured to display the media information corresponding to at least one of the media information categories.

9. The system of claim 1, wherein the user interface is configured to enable the user to enter input as alphanumeric characters.

10. The system of claim 1, wherein the user interface is configured to enable the user to search for the media information by entering alphanumeric characters corresponding to the media information.

11. The system of claim 10, wherein the user interface is configured to responsively display the media information resulting from the alphanumeric search for the media content instances.

12. The system of claim 1, wherein the user interface is configured to display the desired media information selected by the user.

13. The system of claim 12, wherein the user interface is configured to enable the user to select a prior defined media presentation.

14. The system of claim 12, wherein the user interface is configured to enable the user to add or delete media information from at least one of the ranked media information categories.

15. The system of claim 1, wherein the user interface is configured to enable the user to exclude media instances from the media presentation.

16. The system of claim 1, wherein the user interface is configured to enable the user to enter input from a remote control device.

17. The system of claim 1, wherein the processor is configured to receive the media information from a media services server device.

18. The system of claim 1, wherein the media information includes timing data that define start and end times of the media instances among the plurality of the media streams.

19. The system of claim 1, wherein the processor is configured to search for media in-progress and upcoming, that correspond to the desired media information, among the plurality of the media streams.

20. The system of claim 1, wherein the processor is configured to continuously and automatically segue from media in progress to upcoming media based on the ranked media information categories and the selection and ranking of the desired media information with the at least one of the media information categories.

21. The system of claim 1, wherein the processor is configured to cross fade the upcoming media with the ranked in-progress media.

22. The system of claim 1, wherein the processor is configured to buffer at least part of the media instances in the memory to enable the media to be presented in its entirety.

23. A method for presenting a user-defined media presentation, the method comprising:
   providing a user interface, wherein the user interface is configured as a plurality of screen displays, to a user to receive user definition of media information that characterizes media instances for the media presentation by providing a plurality of screen displays for receiving user input that defines the order of the media instances within the media presentation with increasing detail by, in advance of a time corresponding to the media presentation, ranking media information categories and by selecting and ranking desired media information within at least one of the media information categories;

storing the user-defined media information in a data structure;

searching for the media corresponding to the user-defined media information among a plurality of media streams;

automatically segueing media stream changes among the plurality of media streams to present the media instances;

dynamically extracting from the segued media streams the media instances corresponding to the user-defined media information for presentation in the defined order, the defined order based on the ranked media information categories and the selection and ranking of the desired media information within the at least one of the media information categories; and segueing to an upcoming media instance before an end time of a ranked in-progress media instance if the upcoming media instance is of higher rank than the ranked in-progress media instance and if the upcoming media instance has a start time that is before the end time of the ranked in-progress media instance.

24. The method of claim 23, further comprising the step of presenting a predefined list of the media information categories on the screen display.

25. The method of claim 23, further comprising the step of providing at least one of the plurality of the screen displays for displaying a past user defined media presentation.

26. The method of claim 23, further comprising the step of providing at least one of the plurality of the screen displays for enabling the user to add or delete media information from at least one of the media information categories.

27. The method of claim 23, further comprising the step of providing at least one of the plurality of the screen displays for enabling the user to exclude media instances from the media presentation.

28. The method of claim 23, further comprising the step of searching for media in-progress and upcoming, that correspond to the desired media information, among the plurality of the media streams.

29. The method of claim 23, further comprising the step of providing at least one of the plurality of the screen displays for enabling the user to prioritize the order of the media instances of the media presentation.

30. The method of claim 23, further comprising the step of cross fading from the ranked in-progress media to the upcoming media.

31. The method of claim 23, further comprising the step of buffering at least part of the media instances to enable the presentation of the media in its entirety.

32. The method of claim 23, wherein the user interface receives user input from a remote control device.

33. The method of claim 23, further comprising the step of receiving media information about each of the media instances from a media services server device.

* * * * *